US005867484A

United States Patent [19]

Shaunfield

[11] Patent Number: 5,867,484
[45] Date of Patent: Feb. 2, 1999

[54] SWITCHABLE MULTI-DROP VIDEO DISTRIBUTION SYSTEM

[75] Inventor: John E. Shaunfield, Plano, Tex.

[73] Assignee: Intellect Network Technologies, Richardson, Tex.

[21] Appl. No.: 791,201

[22] Filed: Jan. 31, 1997

Related U.S. Application Data

[60] Provisional application No. 60/013,513 Jul. 16, 1996.

[51] Int. Cl.$^6$ .................................................. H04Q 11/04
[52] U.S. Cl. ......................... 370/254; 370/259; 370/352; 370/395; 348/7
[58] Field of Search .................................... 370/222, 254, 370/259, 260, 346, 352, 362, 395, 396, 397, 458; 348/6, 7

[56] References Cited

U.S. PATENT DOCUMENTS

| | | | |
|---|---|---|---|
| 4,389,720 | 6/1983 | Baxter et al. | 370/62 |
| 4,535,454 | 8/1985 | Buzzard et al. | 370/110.2 |
| 4,594,705 | 6/1986 | Yahata et al. | 370/67 |
| 4,627,050 | 12/1986 | Johnson et al. | 370/85 |
| 4,710,917 | 12/1987 | Tompkins et al. | 370/62 |
| 4,787,082 | 11/1988 | Delaney et al. | 370/85 |
| 4,792,942 | 12/1988 | Osato | 370/60 |
| 4,797,877 | 1/1989 | Pope et al. | 370/62 |
| 4,901,308 | 2/1990 | Deschaine | 370/58.1 |
| 4,916,692 | 4/1990 | Clarke et al. | 370/85.1 |
| 4,933,846 | 6/1990 | Humphrey et al. | 364/200 |
| 4,953,159 | 8/1990 | Hayden et al. | 370/62 |
| 5,070,499 | 12/1991 | Maher et al. | 370/61 |
| 5,088,091 | 2/1992 | Schroeder et al. | 370/94.3 |
| 5,276,678 | 1/1994 | Hendrickson et al. | 370/62 |
| 5,475,421 | 12/1995 | Palmer et al. | 348/15 |
| 5,583,864 | 12/1996 | Lightfoot et al. | 370/396 |
| 5,668,803 | 9/1997 | Tymes et al. | 370/346 |
| 5,684,799 | 11/1997 | Bigham et al. | 370/352 |

OTHER PUBLICATIONS

Nevil, "Software Design Document, ECS–2001 Common Communication Protocol," ECS Standard Protocol issue 1.1, Jun. 22, 1994, pp. 1–33.

"Sonet Add–Drop Multiplex Equipment (SONET ADM) Generic Criteria," Bellcore Technical Reference, Issue 3, May 1992.

*Primary Examiner*—Douglas W. Olms
*Assistant Examiner*—Shick Hom
*Attorney, Agent, or Firm*—Sidley & Austin

[57] ABSTRACT

A technique for controlling node equipment in a SONET ring transmission system. Control signals from a control center are transmitted in a selected byte of the SONET frame to each node coupled to the SONET ring. Each SONET node includes a decoder for decoding the control signals as to a destination address, and if a match is found, the node decodes a command field to carry out the representative functions. The command may be to activate or deactivate node circuits, or to receive or transmit video signals in specified VT channels of the SONET frame. In this manner, equipment can be switched on or off at the respective node to thereby optimize the bandwidth efficiency of the SONET network.

33 Claims, 8 Drawing Sheets

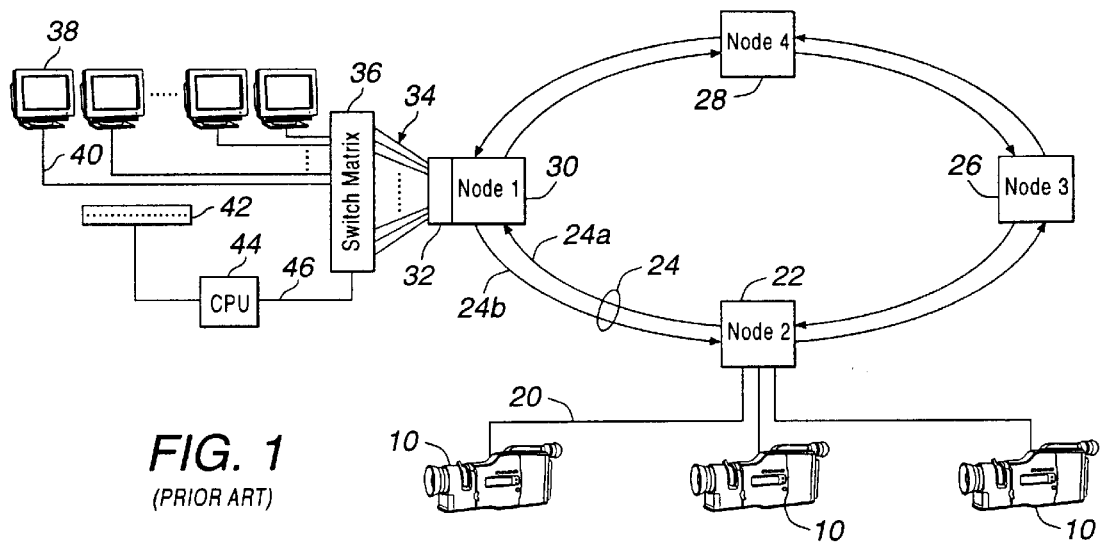
FIG. 1
(PRIOR ART)
FIG. 4a
NMS PROTOCOL
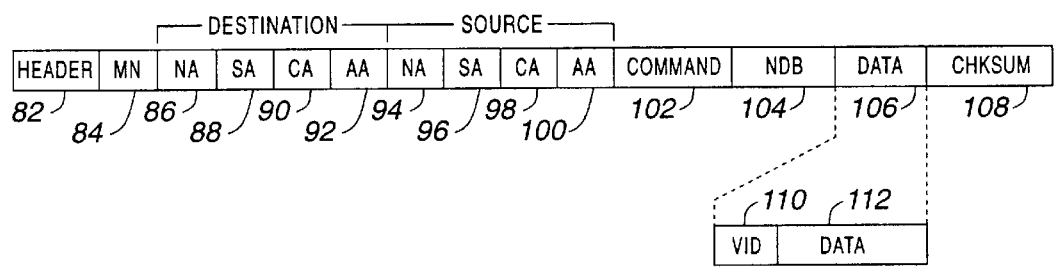
FIG. 4b
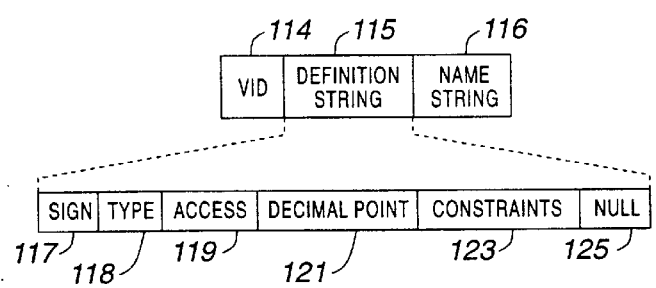

SONET OC-1 FRAME

NODE BACKPLANE

OPTICAL BUS CONTROLLER 120

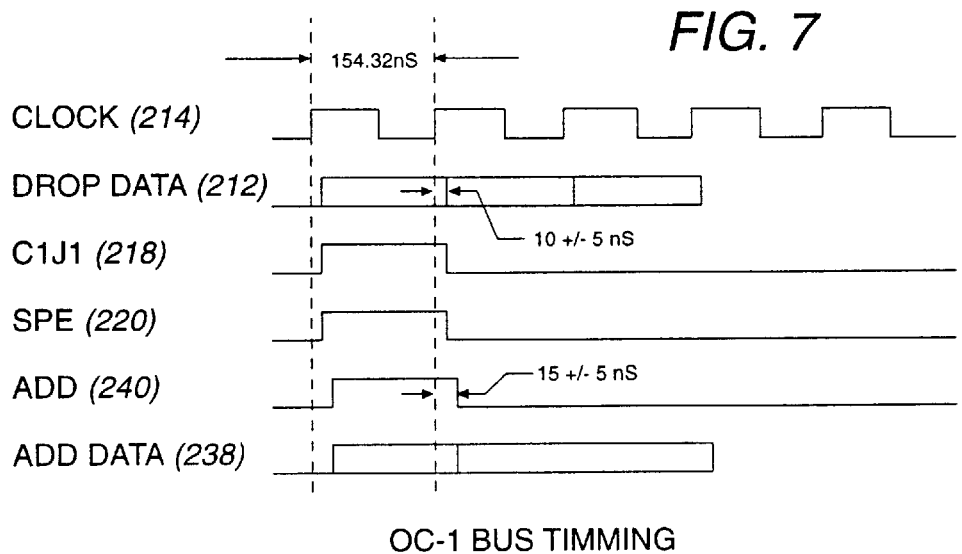
OC-1 BUS TIMMING
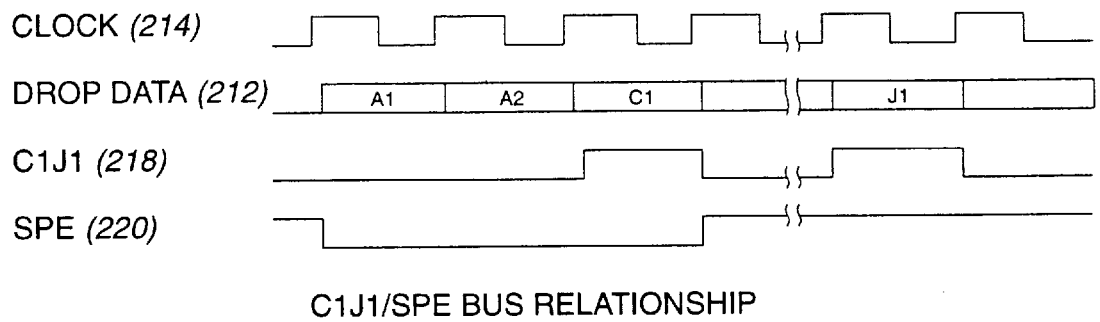
C1J1/SPE BUS RELATIONSHIP
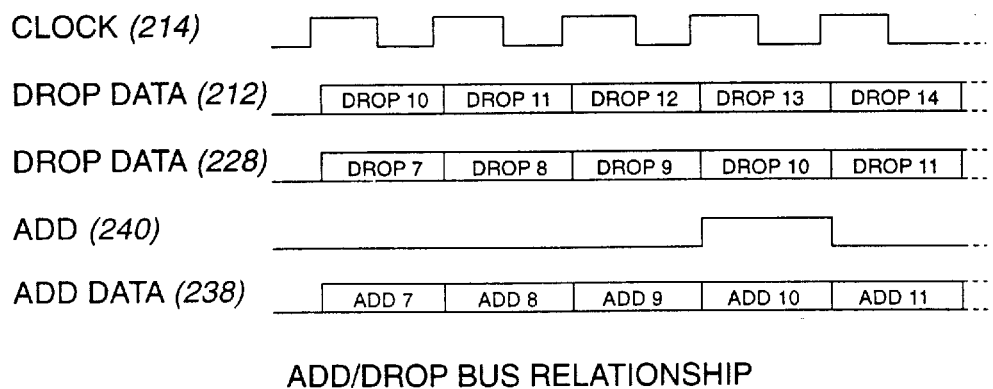
ADD/DROP BUS RELATIONSHIP

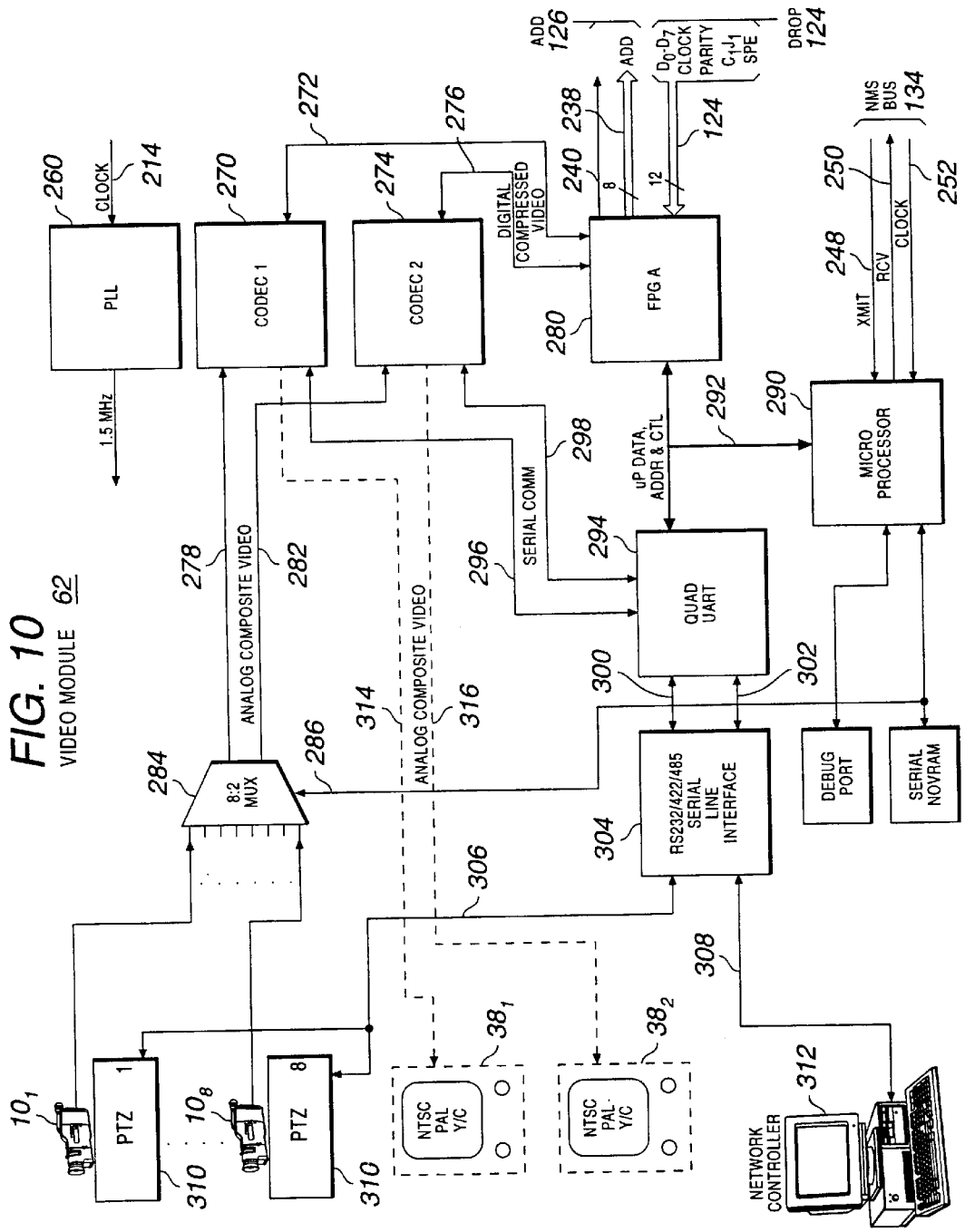

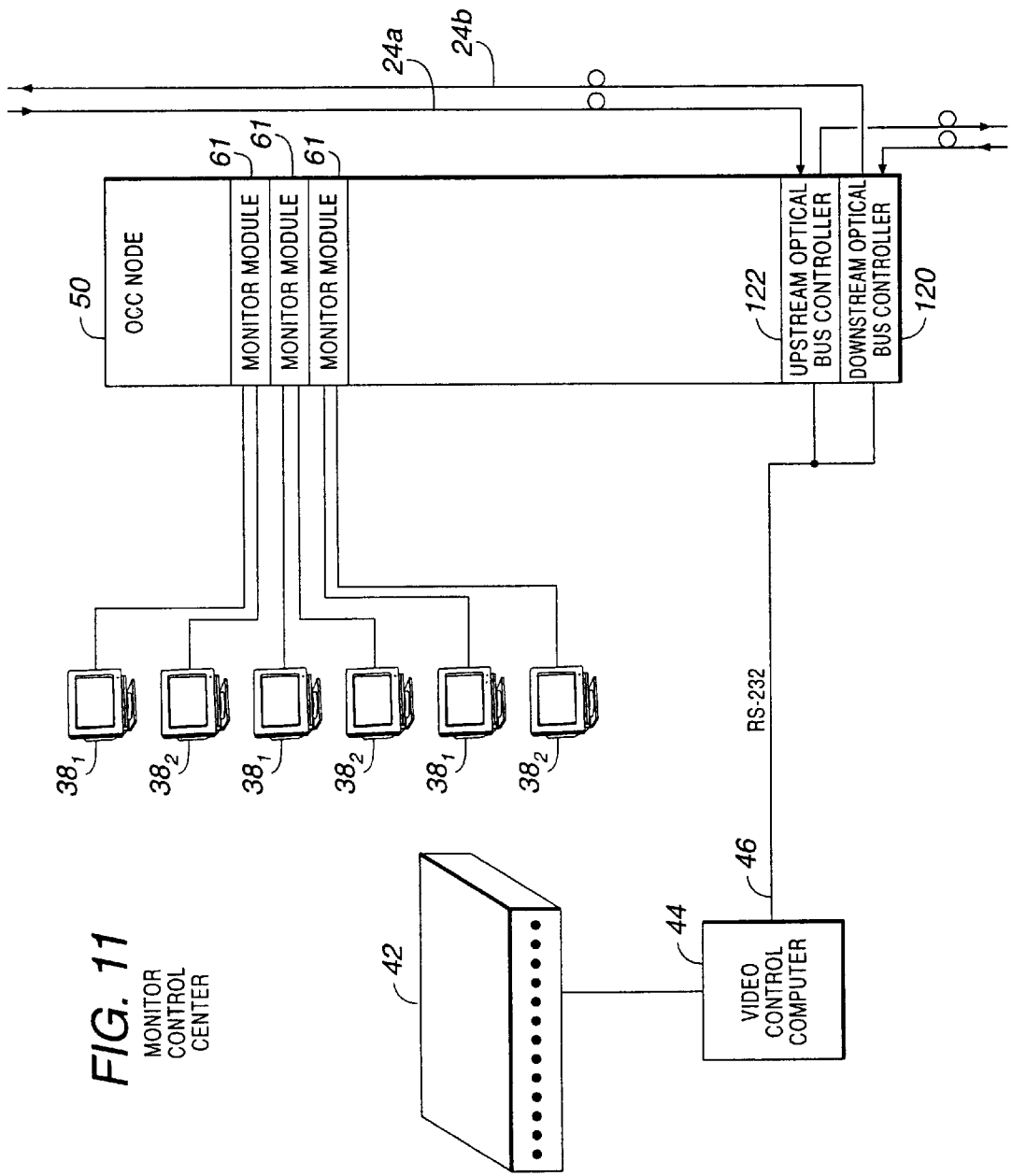

5,867,484

SWITCHABLE MULTI-DROP VIDEO DISTRIBUTION SYSTEM

RELATED APPLICATION

This application claims the benefit of pending U.S. provisional patent application filed Jul. 16, 1996, Ser. No. 60/013,513, and entitled "VIDEO DISTRIBUTION SYSTEM—THE NEXT GENERATION".

TECHNICAL FIELD OF THE INVENTION

The present invention relates in general to the transmission of data through multiple nodes, where data can be extracted, changed or modified at each node. More particularly, the invention relates to the selective control of data transmitters/receivers, such as video cameras and/or monitors, at each node of a video transmission path so that the video equipment can be selectively activated or deactivated to thereby optimize the bandwidth usage of the video transmission system.

BACKGROUND OF THE INVENTION

High speed digital transmission systems have been highly developed and refined to communicate voice, data and other information. The transmission of video signals is also a highly developed technology, both as to analog and digital signals. The transmission of a video image, whether it be still or moving, requires the communication of a substantial amount of information. Present technology is available for transmitting relatively few channels of video information without being unduly complicated or expensive. The digitization of analog signals, including video signals, is a well developed technology. Indeed, digital compression techniques have been developed to compress the digital signals into much lower bandwidths to optimize the usage of the transmission systems. The compression of digital video signals allows for the low cost and efficient transmission of video information on standard digital transmission systems. Such transmission systems can carry voice and data signals, as well as video signals on the same transmission system, without requiring larger or different types of systems.

The transmission of digital signals by way of optical signals is an emerging technology, primarily due to the high speed transmission medium. Moreover, the fiber optic transmission of digital signals has certain inherent advantages as compared to the standard copper twisted pair or coaxial cable counterparts, such as longer life, longer transmission distances without the use of repeaters or regenerators, and much less susceptibility to electromagnetic interference. While the digitalization and compression of data introduces a known amount of signal degradation, the transmission of the compressed digital signals on a fiber optic system adds no further degradation. Indeed, the distance and number of drops in a fiber optic system no longer affect signal quality. This allows video signals to be monitored anywhere in a transmission network without affecting the quality of the video signal. Video signals can thus be more effectively monitored in management or administrative offices as well as at dedicated monitoring stations.

The new video compression standards such as JPEG and MPEG, and others, allow for full motion video to be transmitted in bandwidths as low as 384 kbits/s. Bandwidth requirements affect video quality, with higher bandwidths providing better quality. Relatively high quality video can now be transmitted in bandwidths as low as 2 Mbits/s. These signals are easily carried on standard transmission protocols such as DS-1, E1, frame relay and ATM. Video signals carried by the public communication network allow a camera to be monitored from a remote location anywhere in the world where there is access to a reliable public communication network.

The Synchronous Optical NETwork (SONET) transmission system is being incorporated into all of the major public telecommunication transmission networks on a world-wide basis. In Europe, the corresponding SONET system is known as the Synchronous Digital Hierarchy (SDH) system. The SONET transmission of optical signals is carried out according to a well-known protocol. With the availability of efficient video compression techniques and the world digital transmission standards of SONET/SDH, video information can be distributed in a manner never before considered by the video industry. These new methods are brought about because of low cost digitalization and compression of the previously high bandwidth analog signals. The low cost compression coupled with new switching capabilities of SONET/SDH now allow a switch base distribution system for video signals.

Current video distribution or transmission can be classified into two primary groups, namely entertainment distribution and video monitoring. The entertainment distribution of video information includes normal broadcast and cable television systems where there are a relative small number of video channels and a large number of monitors or subscribers. The video monitoring field includes the security industry, where a large number of camera or video channels are monitored by a relatively few number of monitors or subscribers. The term security is used in a broad sense to include any remote monitoring for obtaining security or operational information. The video monitoring field includes the remote monitoring of power distribution systems and pipelines, the remote monitoring of air, rail and highway transportation system, and the remote monitoring of large facilities such as airports, prisons, manufacturing facilities, campus environments, government facilities, etc.

FIG. 1 illustrates apparatus that is well known in the video distribution field for switching the video signals of a large number of cameras to a smaller number of video monitors. A plurality of video cameras 10 and associated analog-to-digital converters (not shown) couple digitized signals by way of respective T1 carrier lines 20 to a respective node on a counter-rotating optical network 24. The digitized NTSC signals from each video camera 10 are compressed and coupled by the respective node 22 onto both optical fibers 24a and 24b according to the SONET protocol. The optical fiber 24a is duplicated, in that the same information is carried according to the same protocol on the optical fiber 24b, but in an opposite direction. The counter-rotating nature of the optical network shown in FIG. 1 enhances reliability of the system. Each node 22, 26 and 28 may include many video cameras and associated interfaces, as well as data and digitized voice communication capabilities. A base node 30 couples the video signals via a large video switch matrix 36 to a number of monitors. Moreover, while the system of FIG. 1 illustrates four nodes, there may be fewer or many more nodes, each separated geographically up to 100 miles, or so.

The SONET protocol can operate in different modes. The OC-1 mode includes a frame having a total of 810 bytes (e.g., channels) of data, 27 of which are overhead, and the remaining 783 bytes can be used as payload or data. The cyclic period of each OC-1 SONET frame is 125 microseconds. The OC-1 mode is the most typical operating mode, and operates at 51.84 Mbit/s. An OC-3 mode operates at 155.52 Mbit/s; an OC-12 mode operates at 622.08 Mbit/s;

and an OC-48 mode operates at 2488.32 Mbit/s. As can be appreciated, with higher optical carrier operating speeds, much more data can be transmitted per unit of time, but the cost and complexity of the equipment increases accordingly. The SONET protocol is defined in explicit detail in Bellcore Specifications Synchronous Optical Network (SONET) Transport Systems; Common Generic Criteria", Document No. GR-253-CORE, Issue 2, December 1995; and TR-NWT-000496 SONET Add/Drop Multiplex Equipment (SONET ADM), Generic Criteria, Issue 3, May 1992, the disclosure of which is incorporated herein by reference in its entirety.

The video distribution system of FIG. 1 includes a base node 30 having circuits 32 for retrieving the video data from the various SONET VT channels. The video signals are decompressed by the circuit 32 and transferred as basic NTSC video signals on respective coaxial lines 34 to a switching matrix 36. With this arrangement, if the video distribution system had 100 video cameras 10, there would be 100 video cables 34 continuously coupling 100 channels of video signals to the matrix 36. The matrix 36 functions to switch a fewer number of monitors 38 to selectively present the video information on any of the matrix inputs 34. The lines 40 coupling the video monitors 38 to the switching matrix 36 are standard coaxial-type cables. A switch panel 42 is coupled to a computer 44 which, in turn, is coupled by an RS-232 line 46 to the switching matrix 38. The switching matrix 36 includes circuits for decoding the signals on the RS-232 line 46 and for connecting any one monitor 38 to a specific video input 34 of the switch matrix 36. The switch panel 42 may be buttons, switches or a desktop computer and associated mouse, or other equipment.

The conventional video distribution system shown in FIG. 1 is wasteful of bandwidth, in that the video signals of each camera 10 are coupled as continuous live signals to the input of the switch matrix 36, even if the video signal of a camera is not selected by the switch panel 42 for viewing on a monitor 38. As noted above, if 100 cameras are employed in the video distribution system, then the optical network 24 must be capable of simultaneously handling the bandwidth for all 100 channels of video signals, even if only 10 monitors 38 are usable at one time. This type of system is commonly termed a point-to-point system, or a "home run" system, where all the video signals are carried from all cameras to the base node 30. As can be appreciated, the transmission of video signals, even though compressed, requires substantial bandwidth, as compared to other data and digitized voice information. In view that in most transmission systems the bandwidth is limited, the transmission medium becomes quickly and fully utilized, thereby either blocks the communication of other information, or requires long waiting periods for idle times of the transmission medium. It can be seen from the foregoing that a need exists for a technique that reduces the bandwidth requirements of a video distribution system, without limiting the number or flexibility of video cameras utilized therein. Another need exists for a video distribution system in which the bandwidth requirements are dependent upon the number of video monitors utilized, rather than on the number of cameras employed. Yet another need exists for a technique for activating transmission of video signals of each video camera at its node, only when it is selected at the remote monitor control center.

SUMMARY OF THE INVENTION

Disclosed is a video distribution system that overcomes the problems and shortcomings of the prior art systems. In accordance with a preferred form of the invention, monitors and/or video cameras and other equipment can be coupled to each node of an optical network, and switched at the node so that no bandwidth of the transmission medium is required unless the video transmitting apparatus is activated. With this arrangement, no large and expensive video switching matrix is required, thus resulting in a more economical video distribution system where the bandwidth usage is minimized so that more system users or subscribers can be accommodated.

In accordance with a feature of the preferred embodiment of the invention, there is provided a communication from any one node to all other nodes, via a DSO channel of the SONET network. The communication includes a unique address of the target node, a unique address of a device connected to the node, and a command for activating or deactivating the device coupled to the node. Circuits are provided in each node of the optical network, as well as a master node, for intercommunicating to allow specific video cameras to commence transmitting video information in a selected virtual tributary (VT) channel of the SONET frame. Accordingly, when it is desired at the control center to connect, for example, video camera number 50 to monitor number 5, a frame of serial data is transmitted, on a byte-by-byte basis, according to a Network Management System (NMS) protocol, in a specified byte or DSO channel position of the SONET frame so as to be available to each node. The NMS protocol comprises a frame of information, including a source address (of the transmitting node) and a destination address of the target node and video camera or other equipment coupled to the destination node. The NMS frame also includes many command signals which are decoded by the circuits of each node. When the node to which camera number 50 is connected receives the destination address uniquely associated with camera number 50, the bytes of the NMS frame of data will be sequentially retrieved from the SONET network, decoded and employed to control the equipment at such node. The NMS frame also includes data fields which specify the selected VT channels of the SONET frame which should be driven with the compressed video data of camera number 50. In like manner, the master node will also receive the NMS frame as well as its address, so that it can retrieve the video data of camera number 50 from the selected SONET VT channels, decompress the video data, convert it to corresponding analog video signals and transmit the same directly to monitor number 5. In this manner, no large and expensive video switching matrix is required, and no SONET bandwidth is required unless the video camera is selected to actively drive the SONET channels with video information.

Each SONET network node includes duplicated add and drop buses for either retrieving data from specified SONET channels, or for adding new data to the SONET channels. Each node receives commands via the NMS frame (transmitted in a dedicated SONET DSO channel) allowing the addressed video camera to add its video signals to specified SONET VT channels. Other NMS commands can be transmitted to stop the video transmission of a camera to the SONET network, thereby providing camera switching capabilities at each node.

In the preferred embodiment, full moving video is transmitted in a SONET VT Channel, while the NMS commands are coupled around the SONET network in a single DSO byte of the SONET frame. With this arrangement, a number of monitors and/or cameras located at various nodes can be controlled to retrieve the video data from the SONET channels, thereby providing the same video image at the different monitors.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 1 is a generalized block diagram illustrating a video distribution system according to the prior art;

FIG. 4a illustrates a multi-field frame according to the Network Management System protocol that is transmitted in a SONET DS0 channel;

FIG. 4b illustrates a template structure that defines the type of data in a value field of the NMS protocol of FIG. 4;

FIGS. 7–9 are electrical waveforms illustrating the timing between the SONET bytes and the add and drop buses common within each node of the SONET video distribution system;

FIG. 10 is a detailed block diagram of a video module interface; and

FIG. 11 is a detailed block diagram of the Operator Control Center of the video distribution system of the invention.

DETAILED DESCRIPTION OF THE INVENTION

Figure 2:
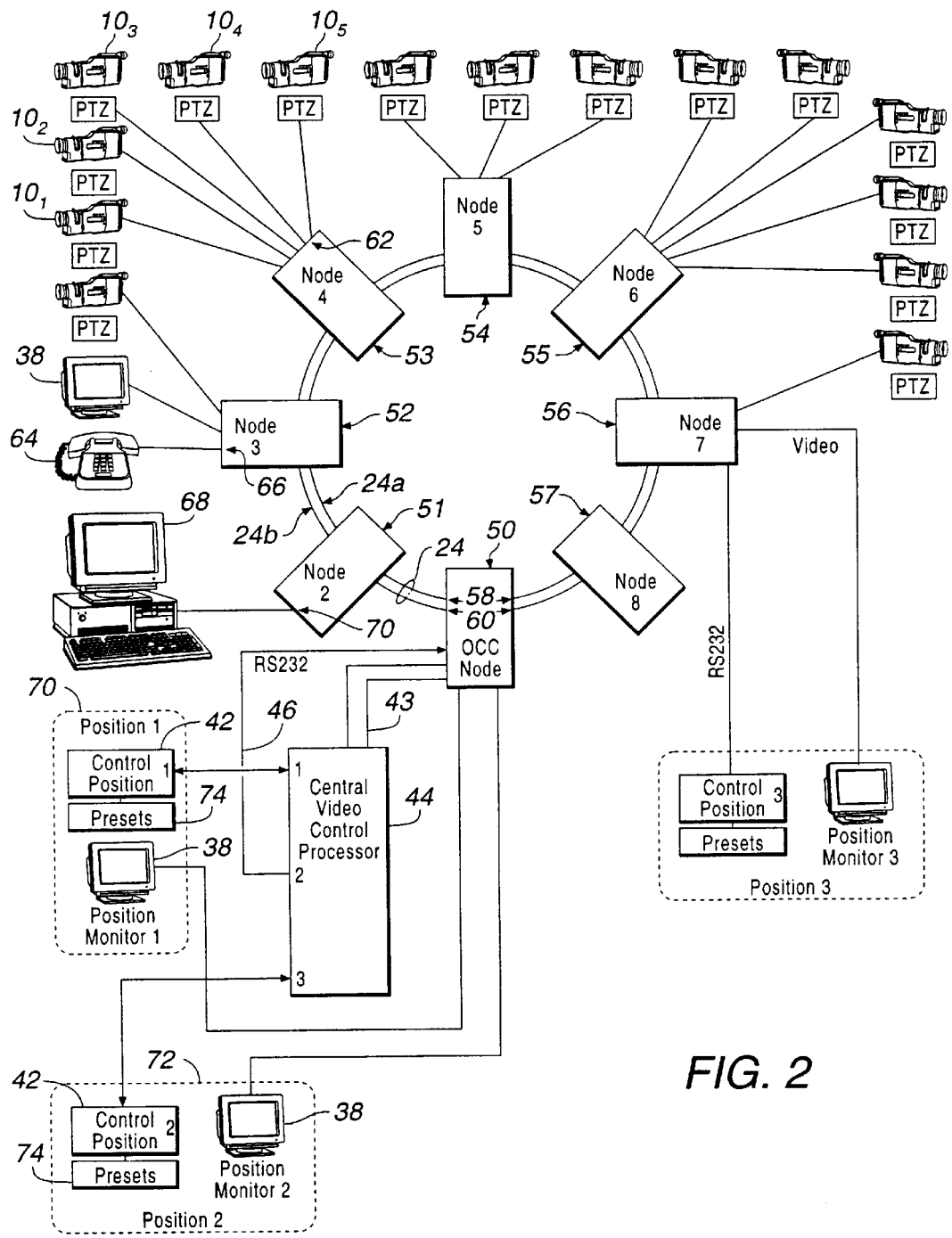
FIG. 2 is a block diagram illustrating the video distribution network constructed according to the preferred embodiment of the invention.

FIG. 2 illustrates a generalized block diagram of the video distribution system constructed according to the preferred embodiment of the invention. While the optical medium 24 includes counter-rotating optical fiber lines 24a and 24b, the duplicate nature of the optical network is not a necessity to the operation of the invention. For purposes of reliability, each fiber optic line 24a and 24b carries the same information according to the SONET protocol, but such information travels in opposite directions. Also, while the optical network 24 is shown as a loop, the invention can function with equal effectiveness with one or more linear optical lines. Those skilled in the art may find that the principles and concepts of the invention can be applied to the switching of equipment on a network employing a transmission medium other than an optical fiber.

Spaced at desired locations along the optical network 24 are a number of nodes shown by reference numerals 50–57. While eight nodes are shown, any number of nodes can be employed with each node spaced apart anywhere from one foot to 100 miles. Each such node comprises SONET multiplexer/demultiplexer (mux/demux) equipment for receiving data via the SONET frames or for multiplexing data into the various bytes of a SONET frame. While the SONET multiplexer/demultiplexer equipment 50 is termed a master unit, in that it is coupled to an Operator Control Center (OCC) with plural monitors 38, a video camera selection panel 42 at each position, a corresponding computer 44, any SONET multiplexer/demultiplexer node 51–57 can provide functions in parallel with the OCC node 50, or in addition thereto. In accordance with an important feature of the invention, the monitor equipment 38, the camera selection panel 42 and the central video control processor 44 do not require any software or hardware modification for use with the video distribution network of the invention.

Each SONET multiplexer/demultiplexer node 50–57, includes a first optical bus controller 58 providing optical I/O ports for one SONET optical line 24a. A second optical bus controller 60 includes optical I/O ports for interfacing with the other SONET optical line 24b. In situations where a SONET multiplexer/demultiplexer node 53 is to be equipped with plural video cameras $10_1$–$10_5$, a video module 62 configured for encoding and compressing is provided for receiving the NTSC video data from the respective cameras 10, compressing the data and allowing the compressed video data to be inserted into a specified VT channel of the SONET frame. According to the preferred form of the invention, each video module 62 can accommodate up to eight video cameras, two being active at any one time. While the video cameras 10 are shown coupled to the video module 62, in practice the cameras are located remotely from the SONET multiplexer/demultiplexer node 53. The video signals are transmitted by way of coax cable or video modems, or similar lines, to the video module 62 of the node. Thus, each of the cameras $10_1$–$10_5$ may be located a mile or so apart from each other, and coupled to the SONET node 53 by various types transmission lines.

The SONET multiplexer/demultiplexer node 52 can accommodate voice communications by way of one or more telephones 64. The voice signals are converted to digital form by conventional codecs and transmitted in selected DS0 channels of the SONET frame. Telephone interface circuits 66 function to interface the voice signals of the telephone 64 for transmission on the optical network 24. One or more computers 68 can be coupled by way of a modem, Ethernet, Token ring, etc. to a data interface circuit 70, which can also be a part of the SONET multiplexer/demultiplexer node 51. The computer data signals can be inserted or retrieved from the SONET network 24 by way of selected bytes of the SONET frame. A computer having Network Management System software can be coupled to any node via an RS-232 line to communicate NMS signals to the bus controller module and configure the circuits of that node, or the circuits of any other node via the SONET ring.

In practice, the SONET multiplexer/demultiplexer nodes 50–57 include respective equipment shelves with multiple circuit board slots and modules pluggable therein so as to be connected to a drop and add bus backplane. Each node 50–57 includes two optical bus controllers 58 and 60, and a mix or match of any of the other types of equipment interface circuits described above. Indeed, those skilled in the art may prefer to develop yet other node interface circuits for the transmission and receipt of digital signals with respect to the SONET network 24.

With regard to the OCC or master node 50, there are provided multiple operator positions, two shown as reference numerals 70 and 72, each having a respective monitor 38, camera selection controls 42 and equipment 74 providing preset capabilities to the equipment at the respective operator position. In practice, each operator position includes plural video monitors for monitoring plural scenes captured by remote cameras. An operator at position 70 has available the position monitor 38 for viewing the still or moving video images presented by any one of the video cameras 10 coupled to the system nodes. The operator can manipulate the controls 42 at the position for selecting different video cameras to present the respective video image on the monitor 38. In addition, preset controls 74 are provided to automatically preset the various controls and monitor image parameters to predefined conditions. The second operator position 72 is similarly equipped.

The OCC node 50 is provided with a video module that is configured as a decoder for receiving video signals from the SONET network 24 and presenting the respective video images to the monitors 38 of the positions 70 and 72.

The position controls 42 and the presets 74 are operable by the position operator to control the video image that is presented on the monitor 38. The position controls and presets are coupled to the respective ports of the central video control processor 44. When a different camera is selected, or a different bandwidth or other criteria, such information is coupled from the position control 42 to the respective port of the central control processor 44. The central control processor 44 processes such information, converts it to a serial format for transmission on a RS-232 line 46 to the OCC node 50. The processors within the OCC node 50 convert the RS-232 data into a serial NMS protocol for transmission via a predefined byte in sequential SONET frames to the various nodes of the system. The format or protocol transmitted on the RS-232 line 46 is generally native to the video equipment, and must be translated by node circuits into the NMS protocol. The translation between the different protocols is carried out in software programmed in the node bus controller modules. The NMS protocol includes various levels of destination addresses for communicating with a particular node device or circuit. In addition, the position controls 42 of each operator position include a joystick (not shown) for controlling the pan, tilt or zoom (PTZ) characteristics of the video cameras. The PTZ data generated at each operator position is processed by the central video control processor 44 and coupled to the OCC node by way of the RS-232 line 46. However, the PTZ data is not transferred around the SONET network 24 by way of the NMS protocol, but rather is transmitted in other SONET frame bytes. The PTZ data is not processed by each node, but merely passed therethrough to the PTZ equipment associated with the respective video camera. As noted above, the video distribution network shown in FIG. 2 does not require the large and expensive video switching matrix, and the central video control processor 44 and the equipment of the various operator positions do not require modification in order to function with the invention.

Figure 3:
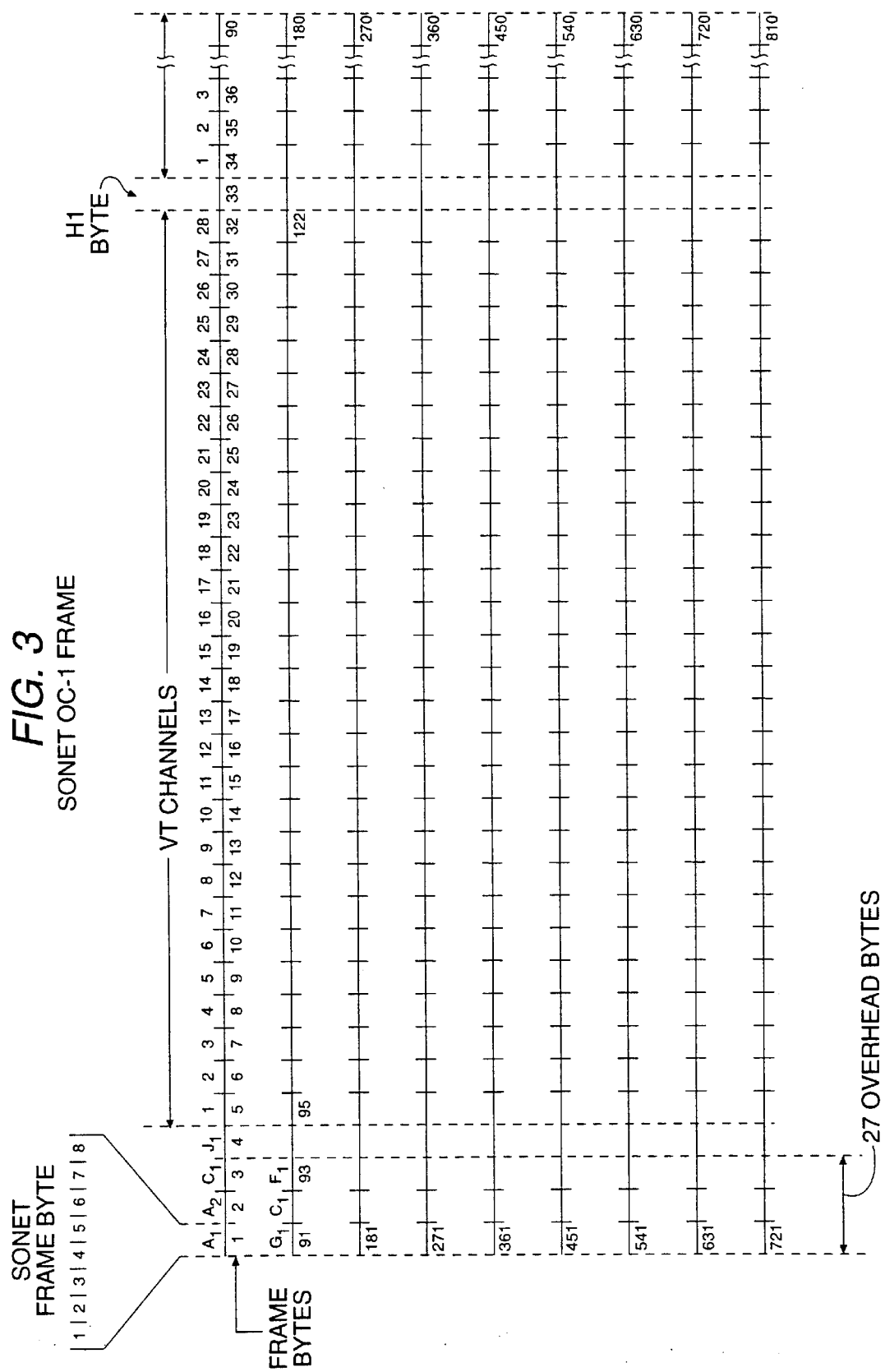
FIG. 3 illustrates the nature of a particular SONET frame protocol.

FIG. 3 illustrates the basic protocol of a SONET OC-1 frame. The entire OC-1 frame includes 810 bytes occurring within a 125.0 microsecond time period. The time slot for each byte is thus 155.32 nanoseconds. The SONET OC-1 frame commences with three bytes, termed $A_1$, $A_2$ and $C_1$ which are decoded for SONET overhead purposes. Byte 4 is shown as a $J_1$ byte denoting that the subsequent byte constitutes the first of twenty-eight payload bytes. In practice, the $J_1$ pointer can be located anywhere in the 783 payload byte positions of the SONET frame to denote that the subsequent bytes are indeed the start of the payload. Bytes 5–32 constitute twenty-eight VT channels that can accommodate data for a corresponding twenty-eight different node devices. SONET frame byte 33 constitutes a fixed stuff byte. Bytes 34–61 constitute a subsequent twenty-eight VT channels. It can be appreciated that byte 5 and byte 34 constitute the first two bytes of a total of 24 bytes transmitted in VT channel one on the SONET network by a node device. While not shown, byte 62 constitutes another $H_1$ stuff byte.

Between SONET frame bytes 4 and 90, there are transmitted three bytes for each of twenty-eight VT channels. In practice, payload bytes 5–32, 34–61 and 63–90 are used for VT channel overhead purposes. The remaining payload byte positions can be used for transmitting VT1.5 channels of video data. With a higher bandwidth, such as VT2.0, more channels would be allocated per video camera, whereby fewer cameras must be utilized to configure each node to determine the bandwidth and the specific VT channels allocated to each monitor. In addition to using the SONET frame to accommodate specified VT channels for the monitors, the SONET DSO channels can be allocated for PCM voice communications, computer data and for carrying the NMS data. While a maximum of twenty-seven video monitors can simultaneously use corresponding VT1.5 channels of an OC-1 SONET frame, there are twenty-four DSO channels that can be utilized for carrying other bytes of data. In the preferred embodiment, one DSO channel is allocated during system configuration for carrying the NMS protocol around the SONET ring to each node. AS is well known to those skilled in the art, the DSO channels of a SONET frame are dynamically assigned, and can be identified and decoded based on the $V_1$ and $V_2$ pointers of a SONET superframe.

In the second row of the SONET frame shown in FIG. 3, bytes 91–93 are termed $G_1$, $C_1$ and $F_1$ and are again overhead bytes, as are the first three bytes of each of the subsequent rows. As shown in FIG. 3, the first three bytes of the nine rows constitute a total of twenty-seven bytes utilized in the SONET frame for overhead purposes. The next twenty-eight bytes, namely bytes 95–122 constitute payload bytes for carrying data in the SONET frame. Row two of the SONET frame includes two additional twenty-eight byte locations for carrying payload data. Indeed, each of the remaining rows of the SONET frame includes a total of three, twenty-eight byte sections for carrying payload data.

Beginning with byte 91, 181, 271 . . . 721, the corresponding three bytes are employed for SONET overhead purposes, and not for the transmission of payload data. With the SONET OC-1 frame protocol illustrated in FIG. 3, each of the twenty-eight VT channels starting with byte position 95 has twenty-four appearances. Thus, each node device can transmit twenty-four bytes of data in each SONET frame. While the exemplary SONET frame shows the first payload byte starting in byte position 5, occurring immediately after the $J_1$ byte, it should be understood that the $J_1$ byte can occur anywhere in the payload portion of the frame to denote that the next byte is the start of the payload data. It should also be noted that each of the twenty-eight VT channels is divided into seven groups, i.e., data byte groups 95–98, 99–102, 103–106, 107–110, 111–114, 115–118 and 119–122. Each group can be utilized as a different bandwidth. Thus, the SONET frames can simultaneously accommodate seven different bandwidths of signals. As noted above, the remaining DSO channels, except for the fixed stuff bytes, can be employed for the transmission of PCM voice signals, computer data or any other data desired by a system user. The SONET OC-1 frame shown in FIG. 3 will be referred to in the description of the invention.

Those skilled in the art and familiar with the SONET frame protocol will appreciate the purpose and function of the overhead bytes in the overall SONET architecture. It is important to note that one DSO byte is dedicated to carrying the NMS protocol. The NMS frame structure is shown in more detail in FIG. 4a. While the NMS frame may be of variable lengths, it is important to note that if an example NMS frame has a total of fifty bytes, then it would take a total of fifty SONET frames for sequentially carrying one byte of the NMS frame in a SONET DS0 byte position. As will be described in more detail below, each of the twenty-eight payload data bytes, starting with byte position 94, can be utilized for carrying video data, digitized voice data, computer data, etc. In view that each SONET frame occurs in a 125 microsecond time period, the frequency of each byte position is 8 kHz. In other words, voice signals sampled at an 8 kHz rate can be digitized and transmitted in a single byte position of the SONET frame. If a larger bandwidth is required, then more than one byte of a SONET frame can be employed for transmitting the data. For example, video signals are generally transmitted on a medium having a bandwidth of at least 1.5 MHz. In order to transmit digitized video signals in a SONET frame at a frequency of 1.5 Mbit/s, than twenty-four byte positions would be utilized. Hence, in transmitting a video byte of one camera in a SONET OC-1 frame, the camera would be assigned a specified VT channel such as identified in the SONET frame of FIG. 3. The digitized video byte of such camera would be placed in the VT channel, for example VT channel slot 1 in twenty-four byte locations of the SONET frame. By transmitting twenty-four bytes of video data in a period of 125 microseconds, a bandwidth of 1.5 Mbit/s is achieved. Moreover, since the twenty-eight VT channels are repeated twenty-four times in the SONET frame, there is a capability of simultaneously transmitting twenty-eight channels of 1.5 Mbit/s continuous data in a SONET frame. If a bandwidth of more than 1.5 Mbit/s is required, then a video module can be programmed or otherwise configured so that the video data of the associated camera is placed in more than one byte position in the twenty-eight VT channel format. While the transmission bandwidth of one camera can be increased with this technique, it is apparent that the bandwidth of other equipment using the SONET frame will be correspondingly decreased. For high bandwidth requirements of a user of the SONET architecture, higher speed SONET frames such as OC-3, OC-12 or OC-48 can be employed. Although the SONET OC-1 frame is described herein in conjunction with the preferred embodiment, those skilled in the art will readily appreciate that the principles and concepts of the invention can be utilized with equal effectiveness in any type of SONET frame protocol.

With reference again to FIG. 4a, there is illustrated a frame 80 of the Network Management System protocol. As noted above, successive bytes of the NMS frame 80 are transmitted in a DS0 byte position of a SONET frame. In this manner, the network nodes can communicate with each other via the SONET frames, using the NMS frame protocol transmitted therein. The NMS frame 80 includes a header byte 82 which indicates the start of the NMS frame or packet 80. A value of 0×FE in the header field 82 indicates a request for data or a request for control. A header field value of 0×80 indicates the packet contains a response to a request for data, or control from a 0×FE packet. A header field value of 0×FD indicates an unsolicited notification message. The notification messages may contain data and/or control information and are typically used to convey automatic protection switch information.

The NMS frame 80 includes a message network label (MN) field 84. The MN field 84 constitutes one byte used by a message originator. The MN field is used to match a response packet to a request packet transmitted from an originating node. This byte may contain any value from 0×00 to 0×FF. A receiving node of a request must return this value in a response packet.

The NMS frame 80 next includes four destination address fields, including a network address field 86, a shelf address field 88, a card address field 90 and an auxiliary address field 92. Each of the four destination address fields includes one byte of information. A 4-byte destination address uniquely identifies a particular module or circuit in a node of the SONET network. When a packet having a full destination address is transmitted by one node, each node in the SONET network receives the NMS frame 80, decodes the destination address fields 86–92, and if a match is found, the remainder of the frame is decoded and processed accordingly. In more detail, the destination address includes the network address (NA) field 86 which is an unsigned byte. The NA field 86 can specify up to 254 sub-network groups. The values 0×00 and 0×FF are wild card addresses. In the preferred form of the invention, the network address field 86 is used to uniquely identify each node coupled to the SONET network. A shelf address (SA) field 88 uniquely identifies an equipment shelf at a respective node. A card address (CA) field 90 uniquely identifies a card or module in a respective shelf of a SONET network node. If a module or card employs more than one identifiable function, an auxiliary address (AA) field 92 is employed to uniquely address different sub-functions on a card.

Much like the destination address fields 86–92, the NMS frame 80 includes four fields carrying a composite source address. The source address fields 94–100 are each one byte in length, and uniquely identify the source of transmission of the NMS frame 80. The source address includes a network address field 94, a shelf address field 96, a card address field 98 and an auxiliary address field 100.

The command field 102 of the NMS frame 80 is a one byte field specifying the commands that are transmitted between the nodes to configure the various functions of the nodes. Two hundred fifty-six different types of commands are possible. A 0×06 value in the command field 102 specifies the reading of a value from a shelf card. A 0×07 command specifies the writing of a value to a card, such as to start using a VT channel. A 0×0A command specifies the writing of a block of bytes to a card. A 0×0E value is carried out to update a nonvolatile memory on a card. A 0×02 command pertains to the busy status of a card.

The NDB field 104 relates to the number of data bytes that will be carried in the data field 106. As its name indicates, the data field 106 carries data that is related to a command transported in the command field 102. For example, if a camera is to be activated to commence transmitting video data on the SONET ring, a 0×07 command will be transmitted in the command field 102 to signify writing to a card, and the data field 106 will include data that specifies that a particular camera is to be coupled to a specified VT channel, with a specified bandwidth. When this is accomplished, the destination node will respond that such action has been accomplished. As can be appreciated, the NMS protocol allows many functions to be controlled without transmitting huge strings of data. It should also be noted that new commands can be utilized that are for controlling video equipment, thereby reducing the number of bytes in the data field 106. For example, a command 0×01 could be used for activating a video camera, and a 0×02 command could be utilized for deactivating a video camera.

The NMS frame 80 includes a CHKSUM field 108. This field holds the checksum value for the frame. The checksum is calculated over all bytes of the frame except for itself, i.e. from the HEADER through the last DATA byte. To calculate the checksum, the sum of zero is first used. Each byte of the frame is then added thereto, in order starting with HEADER, to the sum modulo 255. Then the two's complement of the sum is taken by inverting all bits (one's complement) and adding one thereto.

With reference again to the data field 106, it is noted that data transmitted in the data field 106 includes a two-byte Value Identification (VID) field 110 and data 112 that relates to the VID. A VID 110 relates to a parameter or function such as crop, resolution, queue, VT channel, camera activate, camera deactivate, etc. which specify the operation of a video camera. If the VID 110 corresponds to resolution, the data 112 associated with the VID number corresponds to the extent of resolution. Every card in a node contains a set of data. This data is used to report alarm conditions and performance monitoring, to set configuration states, and generally control the functions of the card. A uniform mechanism is utilized to manage these pieces of data, called values.

A value can be one of four types; Byte, Word, Long, or String. Each value in a card is referred to by a unique two-byte integer, called the VID 110. When a system, such as a craft terminal or Network Manager, requests a value from a card, it refers to that value using the VID 110. The card then returns the value. The requesting system must also have a template for the value. The template defines the data by declaring its type, length, constraints, and other important information. Typically, the requester obtains the template only once, and stores it locally for subsequent uses.

For multi-byte values in the data field 112 (word, long, string), the bytes are transmitted MSB first, LSB last, in order. All data strings are null terminated. The null terminator must be transmitted with the string. The null terminator is not considered part of the maximum length specified in the template.

Templates define the type of data contained in a value. A template structure 113 is shown in FIG. 4b. Templates 113 are referred to by the same VID 114 as its associated value.

A template begins with the VID 114 of the value it is defining. A definition string field 115 contains the type information. A name string field 116 contains the human readable name of the value. This is often used when displaying the value on the craft terminal or Network Manager System. Both strings must be null-terminated. The fields of the definition string 115 are defined as follows.

SIGN field 117—This field is optional. It defines whether the value is signed or unsigned. If the value defined is to be signed, then an ASCII '−' (minus) is placed in this position. By default, all values are unsigned integers. Placing a '−' in front of a non-integer type has no effect, and is ignored.

TYPE—This field is required. A value can be defined to be one of several types. A type is selected by placing its one-character name in the type field. The following types are:

B—Byte, a single byte integer, displayed in base 10 (decimal) format.

b—byte, a single byte integer, displayed in base 16 (hexadecimal) format.

W—Word, a two byte integer, displayed in base 10 (decimal) format.

w—word, a two byte integer, displayed in base 16 (hexadecimal) format.

L—Long, a four byte integer, displayed in base 10 (decimal) format.

l—long, a four byte integer, displayed in base 16 (hexadecimal) format.

S—String, a variable length, null terminated string.

T—Time, represents a specific time and date. Time is identical to Long, except that when displayed it is converted to a date/time representation. This measurement is precise to one second.

P—Precise Time, represents a specific time and date. Precise Time uses a Long to represent time precise to one second, and an additional byte to represent 1/100'ths of a second.

ACCESS field 119

This field is required. It defines whether a value can be written to. The character 'R' is placed in this field if the value is read-only. The character 'W' is placed in this field if the value can be read and written.

DECIMAL POINT field 121

This field is optional. It indicates the number of decimal places to the left to move the decimal point when displaying an integer value. The legal values for this field are the ASCII digits '1' through '9'. For decimal (base 10) format divide the integer to be displayed by 10 to the power of DECIMAL POINT. For hexadecimal (base 16) format divide it by 16 to the power of DECIMAL POINT. This field is invalid for all all non-integer types.

CONSTRAINTS field 123

This field is used by the craft terminal or Network Manager System when displaying or altering data. This variable length string places certain constrains on the contents of the defined value. There are three kinds of constraints that can be placed on a value. Only one constraint is allowed per value. The three constraints, Range, Max-Length and Enumeration, are defined as follows.

RANGE

A range can be specified to limit the range of legal values for an integer value. This constraint is value only for Bytes, Words, or Longs, This constraint is defined by enclosing a pair of numbers separated by ellipses within parentheses. Examples: (0 . . . 255), (1 . . . 3)

MAX-LENGTH

This constraint is used only for strings. It sets the maximum length of a string. This limit does not include the null terminator byte required at the end of all strings. This constraint is defined by enclosing the length specified within brackets. Examples: [10], [35]

ENUMERATION

This constraint is used to associate a set of names with the legal integers of a value. Enumerations are defined by enclosing the enumeration rule within braces. The definition of the enumeration conforms to the rules for enumerations in ANSIC. A number may be assigned to an enumerated name by using the '='. If no '=' is used, then the first name assumes the value zero. The next unassigned name takes the next highest value, the so on. In the first example below, FALSE is assigned the value 0 (zero), and TRUE is assigned the value 1. In the second example, 2 is assigned to GREEN and 3 is assigned to YELLOW.

Examples: {FALSE, TRUE), {RED=1, GREEN, YELLOW), {MINE=2, YOURS=3, OURS=5 }

NULL FIELD 125

The constraints string must be terminated by an ASCII NULL (0×00) character.

The name string field 116 contains any variable length, null-terminated, ASCII string. This string is often displayed next to the value.

Several values that are common to all cards are shown below. Each card must contain all of the following VIDs. VIDs from 0×0000 through 0×00FF are reserved for this section.

```
0x0000,"BR","HIGHEST ALARM LEVEL"      /* of this card only */
0x0001,"SR[10]","BOARD TYPE"           /* of this card */
0x0002,"SR[50]","BOARD DESCRIPTION"    /* of this card */
0x0003,"SR[20]","SOFTWARE PART #"      /* of this card */
0x0004,"SR[10] SOFTWARE VERSION #"     /* of this card */
0x0005,"TR","LAST BOOT"                /* Time of last boot */
0x0006,"BR","SLOT NUMBER"              /* Slot Number the card
resides in */
```

A typical node request and a node response to the commands "read values from a card", and "write values to a card", are described and shown in the tables below.

The command 0x06—Read Values from a Card requests/returns a value or list of values from a target card. Each card contains a set of variables containing configuration, alarm status, performance monitoring values, etc. As noted above, each value is identified by an integer, called a Value ID 110. The value returned may be a Byte, Word, Long, or String. The Template 113 for a value is used to determine the type, and therefore the length of a value.

If a card does not contain a variable matching a requested VID, then the VID will not be included in the list returned to the requestor. In some cases this means the response will contain only the command number, 0x06. A typical 0x06 request is shown in Table 1 below.

TABLE 1

REQUEST

| Byte Number | Field | Value |
|---|---|---|
| 0 | Command | 0x06 |
| 1 | Number of Bytes | n |
| 2 | Value ID#1 | VID |
| 3 | Value ID#2 | VID |
| ... | ... | ... |
| n+1 | Value ID#n | VID |

In the first byte of the command field 102, there will be the one-byte command 0x06, identifying that a value is to be obtained from a node card or module. The next line of Table 1 shows that the NBD field 104 contains a number that identifies the number of bytes in the data field 106, including the one-byte VID field 110 and the value data 112 associated with the VID field 110. Byte number two and three correspond to two VID numbers. The VID numbers may be parameters corresponding to VT channels, VT bandwidth, camera off, camera on, etc. For every value desired by a requester, there will be a corresponding VID number in the data field 112. The VID numbers are concatenated together in a string.

Table 2 shows a response to the request shown in Table 1. The command field 102 of the response contains the same command as in the request, namely a read value from a card command 0x06. The next byte shown in Table 2 is the number of bytes in the data field 106. The third and fourth bytes of data contain the most significant bits and the least significant bits of the VID. The fifth byte contains the data corresponding to VID #1. The data in this example contains one byte. The sixth and seventh bytes contain the most and least significant bits of VID #2. The eighth and ninth bytes of Table 2 show that two bytes are used to return the data value of VID #2.

TABLE 2

RESPONSE

| Byte Number | Field | Value |
|---|---|---|
| 0 | Command | 0x06 |
| 1 | Number of Bytes | 7+... |
| 2 | Value ID#1 MSB | VID |
| 3 | Value ID#2 LSB | VID |
| 4 | Value Data #1 | Data |
| 5 | Value ID#2 MSB | VID |
| 6 | Value ID#2 LSB | VID |
| 7 | Value Data #2 | Data 1 |
| 8 | Value Data #2 | Data 2 |
| ... | ... | ... |

By requesting and returning values from a node card, it can be determined which VT channel is being used by a camera; which VT channel is being used by a monitor; whether video module is configured as a camera card, a monitor card, or both; whether a bus controller card is configured as a master or slave; whether an elastic store memory is activated in a bus controller card; which one or two cameras of a card are selected, etc.

This command 0x07—Write Values to a Card writes a value or list of values to a target card. Each value is identified by an integer, called a Value ID 110. The value returned may be a Byte, Word, Long, or String. The Template 113 for a value is used to determine the type.

The VID's are returned to the requester. This serves to acknowledge that the values were received by the target card. If a card does not have a variable defined for a particular VID, then that VID will not be included in the list returned to the requester. Tables 3 and 4 below illustrate a request to write a value to a card, and a corresponding response.

TABLE 3

Request

| Byte Number | Field | Value |
|---|---|---|
| 0 | Command | 0x07 |
| 1 | Number of Bytes | NDB |
| 2 | Value ID#1 | VID |
| 3 | Value Data #1 | Data |
| 4 | Value ID#2 | VID |
| 5 | Value Data #2 | Data 1 |
| 6 | Value Data #2 | Data 2 |
| ... | ... | ... |

TABLE 4

Response

| Byte Number | Field | Value |
|---|---|---|
| 0 | Command | 0x07 |
| 1 | Number of Bytes | n*2 |
| 2 | Value ID#1 MSB | VID |
| 3 | Value ID#1 LSB | VID |
| 4 | Value ID#2 MSB | VID |
| 5 | Value ID#2 LSB | VID |
| ... | ... | ... |
| n+1 | Value ID#n MSB | VID |
| n+2 | Value ID#n LSB | VID |

The "write values to a card" command is carried out in a manner similar to the "read value from a card" described above. However, in writing a value to a card, the circuits of a card are generally reconfigured to carry out a function or activate a device. For example, a VID corresponding to camera activation, a VID corresponding to a VT bandwidth and a VID corresponding to a VT channel can be transferred via the NMS frame 80 to a destination node. The destination node will decode the destination address and identify the target device, e.g., a camera in this example, decode the other fields of the NMS frame 80 and activate the addressed camera to commence transmitting video data into the specified VT channels having the requisite bandwidth. The destination node will, in turn, respond to the request so that the requesting node receives an acknowledgment that the specified action has been carried out. The specific camera can be turned off by transmitting a request having the same VID, but with data values in the field 112 signifying that the camera is to stop transmitting in the specified VT channel. Subsequent requests can be transmitted to change the camera transmission from one assigned VT channel to a different VT channel. By utilizing the NMS protocol of FIGS. 4a and 4b, the node equipment can be controlled to conserve the usage and bandwidth of the SONET network.

Figure 5:
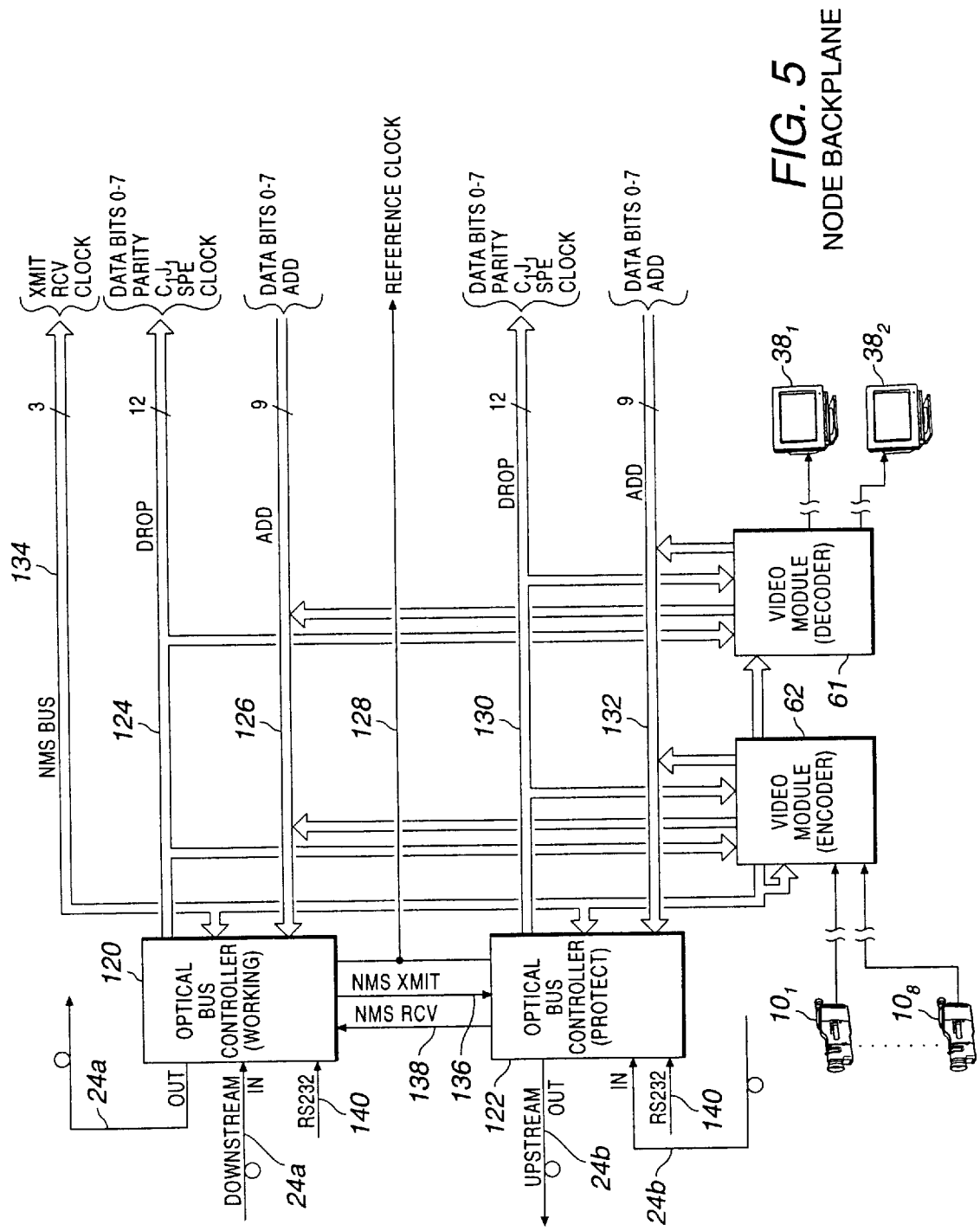
FIG. 5 illustrates in block diagram form an optical control interface between the SONET network and a duplicated add bus and drop bus backplane that provides connections with other node module equipment.

In order to practice the present invention using a SONET network for switchably activating video cameras at one or more nodes, each node includes a shelf of equipment with a number of circuit cards or modules. The equipment shelf includes a printed wire backplane having a number of buses interconnecting the circuit modules together. Each equipment shelf of a node includes a pair of optical bus controllers, each for interfacing a respective optical fiber 24a or 24b, to the circuits of the node. FIG. 5 illustrates in block diagram form the interconnections between the optical bus controllers, the backplane buses and the video module cards. Shown are the duplicate optical bus controllers 120 and 122. The optical bus controller 120 is identified as a "working" controller while the other controller 122 is termed the "protect" controller. The working controller 120 is the principle circuit for transmitting the SONET frames on the primary optical fiber 24a, while the other controller 122 is a backup for duplicating the SONET frame data on the other optical fiber 24b. Functionally, the protect optical bus controller 122 is structured and functions in an identical manner as the working optical bus controller 120. Stated another way, the circuit modules 120 and 122 are interchangeable in the slots of the node equipment shelf. As such, the primary operation of only one bus controller will be explained.

The working bus controller 120 couples from an optical input port thereof the SONET frames carried by the downstream optical fiber 24a. The optical bus controller 120 converts the serial optical signals to corresponding electrical signals, and converts the respective bits of the SONET frame to a byte-serial format output on a drop bus 124. The drop bus includes eight parallel lines for carrying a byte of data, a parity line, a $C_1J_1$ signal line, a SONET Payload Envelope (SPE) line and a transmit clock signal line. The transmit clock signal line is at a byte frequency of 154.32 nanoseconds. The optical bus controller 120 has a 9-bit input port comprising an add bus 126. The add bus 126 includes eight bits of data and an add signal line. As will be described more fully below, the add signal line identifies when a byte on the drop data bus 124 is to be modified or otherwise changed by a byte on the add bus 126. An add bus byte is inserted as a new byte in the appropriate drop bus byte position. The optical bus controller 120 provides an output reference clock 128 of a 6.48 MHz frequency. In like manner, the protect optical bus controller 122 includes a similar drop bus 130 and add bus 132. The drop bus 130 carries the duplicate bytes of the SONET frame that are carried by the working drop bus 124. The add bus 132 carries duplicate bytes corresponding to those carried on the working add bus 126.

The optical bus controller 120 has an I/O port carrying a 3-bit NMS bus 134. The NMS bus 134 comprises a transmit line, a receive line and a clock line. The function of the NMS bus 134 is for allowing communications between the other modules coupled to the backplane, such as a video module (encoder) 62 or a video module (decoder) 61, shown in FIG. 5. A video module can be configured by way of software to function as either an encoder 62 for coupling video signals from one or more cameras 10 to the add buses 126 and 132, or configured as a decoder 61 for coupling signals from the drop buses 124 and 130 to a video monitor 38. The NMS bus 134 is utilized to communicate with the video modules 61, 62 and any other modules coupled to the backplane, for enabling or disabling circuits, for specifying the particular VT channels to be read or written, etc.

The working optical bus controller 120 communicates with the protect optical bus controller 122 by way of an NMS transmit line 136. In like manner, the protect optical bus controller 122 communicates or otherwise responds to the working bus controller 120 by way of an NMS receive line 138.

Lastly, the optical bus controller 120 includes a serial input RS-232 port 140 utilized by a local computer for programming or otherwise configuring the various circuits of the node. Network management software loaded into the computer can be utilized to convey NMS frames to the controller 120 for configuring circuits thereof, or for further transfer by the controller 120 to the video or other modules of the node for initial programming thereof. In addition, if the destination address of the NMS frame 80 does not match the node to which the computer is connected, the NMS frame 80 is transmitted in a DSO channel of the SONET network to the other nodes. The protect optical bus controller 122 includes a similar RS-232 port 140.

Figure 6:
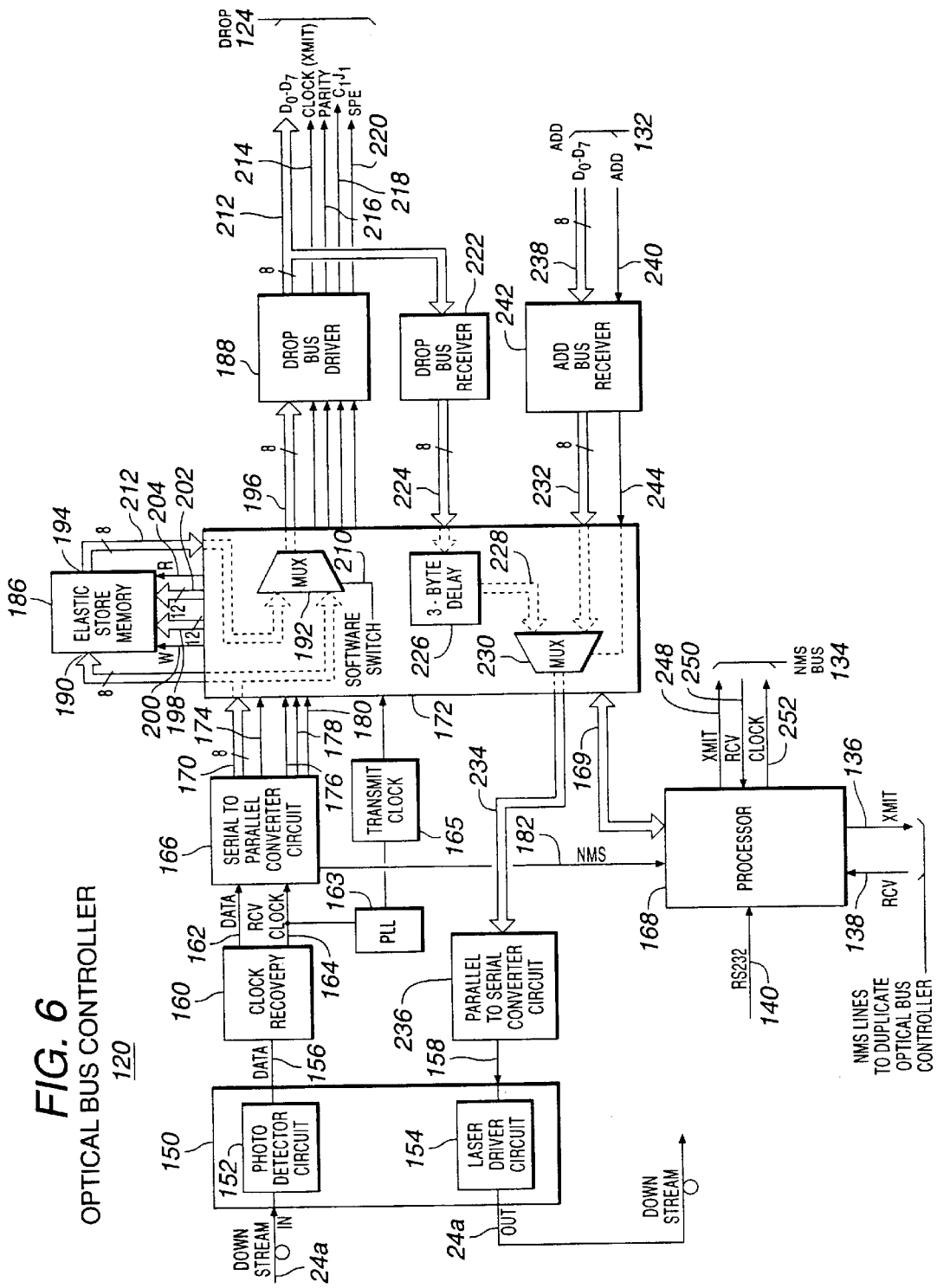
FIG. 6 is a detailed block diagram of the optical bus controller module of FIG. 5.

FIG. 6 illustrates in detailed block diagram form the optical bus controller 120 and the various circuits thereof. As noted above, the protect optical bus controller 122 is identically configured. The optical bus controller 120 includes an optical/electrical interface 150, comprising a photo detector circuit 152 for converting the incoming optical signals on the downstream fiber 24a to corresponding serial electrical signals on line 156. The electrical signals on the serial data line 156 correspond identically to the optical signals on the serial downstream fiber 24a. The optical/electrical interface 150 also includes a laser driver and corresponding circuits 154 for converting the serial electrical signals on line 158 to corresponding optical signals on the output downstream fiber 14a. The interface 150 is of conventional design, where the laser driver 154 includes temperature, aging and other compensation circuits well known in the art.

Each OC-1 SONET frame which comprises 810 bytes is transferred in serial form via the serial data line 156 to a clock recovery circuit 160. The clock recovery circuit is of conventional design for recovering a clock signal from the serial electrical signals of the SONET frame. The clock recovery circuit 160 provides the entire SONET frame on the output serial line 162, and a 51.84 MHz receive clock signal on line 164. This frequency corresponds to the bit rate of the data bits received in a SONET frame. The receive clock 164 is coupled to a phase lock loop circuit 163 and to a transmit clock circuit 165 which is activated to reproduce the same receive clock signal 164 on the transmit clock line 214 of the drop bus 124. When the bus controller is configured as a master, the receive and transmit clock signals are independent of each other. The independent nature between the receive clock and the transmit clock allows an elastic store memory 186 to take into account the round trip signal delay around the SONET ring so that the total delay is equal to multiples of one complete SONET superframe which occurs in 500 µS.

The signals coupled on line 162 and the receive clock signal on line 164 are coupled to a serial-to-parallel (S/P) converter circuit 166. The serial-to-parallel converter circuit 166 is adapted for processing SONET ring signals, and includes a processor interface coupled by a bus 182 to a processor 168. The S/P converter circuit 166 is identified as either integrated circuit type TXC-03001, manufactured by Transwitch Corporation, Shelton, Conn., or as types PM 5343-RI and PM 5344-RI used for OC-3, obtained from Gnubi Communications Inc., Addison, Tex. It is to be noted that all the published data sheets of each integrated circuit identified herein are incorporated by reference as if fully set forth herein. The S/P converter circuit 166 includes a number of decoders and registers for decoding the SONET overhead bytes for alarm, status and other information. On the detection of various alarms, the S/P converter circuit 166 provides an interrupt to the processor 168 for processing the SONET alarm signals. The S/P converter circuit 166 provides a parallel 8-bit output on bus 170 to a programmable array logic chip 172. In the preferred embodiment, the PAL chip 172 comprises a field programmable gate array chip. In addition to the data bytes output on bus 170, the S/P converter circuit 166 also provides odd parity, $C_1J_1$ and SPE signals on respective lines 174, 176 and 178. A two-bit signal is also provided to the PAL circuit 172 on line 180, as decoded by the SIP converter circuit 166 from the $H_4$ overhead bits of the SONET frame. As noted above, these two bits of the SONET $H_4$ byte identify which one of the four frames in the SONET superframe is presently being processed. Lastly, the S/P converter circuit 166 provides a serial line 182 to the processor 168 for carrying the NMS frame 80 (FIG. 4).

The PAL chip 172 is identified as integrated circuit type XC5210PQ240, manufactured by Xilinx, San Jose, Calif. The PAL circuit 172 is associated with an elastic store memory 186 which, when enabled, provides a time delay in transferring the SONET bytes from the S/P converter circuit 166 to a drop bus driver 188. While every node in the SONET network of the invention includes at least one optical bus controller 120, only one controller in the SONET network has the elastic store memory 186 enabled. In the other optical bus controllers of the various nodes, the elastic store memory 186 is disabled. The purpose of the elastic store memory 186 is to prevent the loss of SONET data in networks that are short or have few nodes therein. In view that it takes 125 microseconds to transmit a full OC-1 SONET frame, in short-length networks or networks having few nodes, the initial bytes of a frame transmitted in the SONET ring may be received by the same transmitting node before such node completes the transmission of all of the bytes of the frame. To prevent the loss of the initial bytes received in a node transmitting such frame, the elastic store memory 186 provides the requisite delay to prevent the loss of any byte of a transmitted SONET frame. The elastic store memory preferably provides a delay of about 0–500 microseconds.

In practice, the elastic store 186 comprises a dual port SRAM having 4K×8 storage capabilities. The elastic store memory 186 includes sufficient addressable locations for storing four SONET frames. Each byte of a SONET frame is carried from bus 170 in the PAL chip 172 to both the data input 190 of the elastic store memory 186 and to one input of a 2:1 multiplexer 192. In addition to writing data in the memory via the 8-bit input 190, data can be read from the memory 186 via an 8-bit output port 194. The output of the memory 186 is coupled via bus 212 to the other input of the 2:1 multiplexer 192. The output of the multiplexer comprises an 8-bit bus 196 coupled to the drop bus driver 188. Other signals coupled from the PAL chip 172 to the elastic store memory 186 comprise a 12-bit write address bus 198, and a write signal on line 200, a 12-bit read address bus 202 and a read signal line 204. The elastic store memory 186 can be written and read simultaneously, if the read and write addresses are not identical. While not shown, the elastic store memory 186 is partitioned into four 1K sections, each section for storing one SONET frame of a superframe. As is well known to those skilled in the art, four SONET frames comprise a superframe, and the two bits of the $H_4$ overhead byte define which frame of the superframe is then in existence. Accordingly, the 2-bit bus 180 couples to the PAL chip 172 the $H_4$ signals employed to identify which section of the elastic store memory 186 the SONET frame is to be written therein.

The PAL chip 172 includes a write address counter and a read address counter (not shown) for providing addresses in the writing and reading of the elastic store memory 186. The address of the write counter and the address of the read counter are offset so that a specified time delay is provided. The offset corresponds to the time difference between he receive clock and the transmit clock of the master bus controller 120. It is noted that the receive clock is used in the writing of the elastic store memory 186 with SONET frame data, and the transmit clock is used in reading such data from the memory 186. For example, with a 3-frame round trip delay (375 µS), when the byte of the fourth SONET frame is being written in the fourth section of the elastic store memory 186, the initial byte of the first SONET frame is being read from the first memory section. It is noted that the rate at which the elastic store memory 186 is written and read is the same, but the addresses of the write and read counters are offset to an extent such that the total SONET round trip delay is equal to a factor of 1, 2, 3, etc. times 125 µS. The write address counter and the read address counter in the PAL circuit 172 are incremented in a sequential manner, with the specified addresses being offset, and remain at such offset during operation. It should be noted that the technique of utilizing an elastic store memory, as described, in providing a delay in a SONET ring network has been utilized as part of the prior art.

As noted above, the optical bus controller 120 can be configured to either enable or disable the elastic store memory 186 and thus provide or eliminate the delay capability with respect to such module. In practice, one optical bus controller module (pair) will be enabled in a SONET optical fiber ring, while the elastic store memories of all other nodes connected to the optical fiber will be disabled. The enabling and disabling of the elastic store memory 186 is achieved by a software-controlled signal applied to the control line 210 of the data bus multiplexer 192. When the multiplexer 192 is enabled, the SONET frames pass through the elastic store memory 186, are coupled to the multiplexer 192 on bus 212, and output from the multiplexer on bus 196. Accordingly, the SONET frames undergo a delay in being written and subsequently read from the elastic store memory 186. When the multiplexer 192 is disabled, the SONET frame bytes carried on the bus 170 are passed through the multiplexer to bus 196. When the bus multiplexer 192 is disabled, circuits in the PAL chip 172 also cause the receive clock on line 164 to be reproduced in synchronism as the transmit clock on line 214. The enable signal coupled to the control line 210 of the multiplexer 192 is a latched signal having two states, one for coupling the signals on input bus 212 to the multiplexer output bus 196, and the other state for coupling the other input bus 170 to the multiplexer output bus 196. The state of the signal on control line 210 can be placed in a logic high or low state during the configuration of the optical bus controller 120.

A drop bus driver 188 receives the inputs from the PAL chip 172, as shown in FIG. 6, and drives the backplane lines and buses with the same signals. The drop bus driver 188 is of conventional design for providing the requisite electrical drive capabilities of the signals on backplane conductors of a SONET node shelf. In particular, the drop bus driver 188 drives an 8-bit bus with byte serial data of the SONET frame. In addition, the driver 188 provides a 6.48 MHz transmit clock signal on clock line 214, odd parity signals on line 216, a $C_1J_1$ signal on line 218, and a synchronous payload envelope (SPE) signal on line 220. The timing relationship between these signals is shown in more detail in FIGS. 7–9.

In addition to driving the 8-bit data bus 212, the drop bus driver 188 also drives a drop bus receiver 222 with the byte serial SONET frame signals. The drop bus receiver 222 couples the byte serial signals on bus 224 to a delay circuit 226 that is part of the PAL chip 172. The delay circuit 226 comprises a FIFO register for delaying each SONET frame byte by three byte intervals, or about four hundred sixty three nanoseconds. After having been delayed by three clock cycles, the byte serial SONET frame data is coupled on bus 228 to a 2:1 multiplexer 230. The multiplexer has a pair of 8-bit input buses, one being bus 228 and the other being bus 232. The output of the multiplexer 230 comprises an 8-bit bus 234 coupled to a parallel-to-serial (P/S) converter circuit 236. In practice, the P/S converter circuit 236 is part of the same integrated circuit as the S/P converter circuit 166.

The multiplexer 230 comprises a portion of the circuit for modifying the drop bus bytes with byte data that appears in the corresponding time slots of an 8-bit add bus 238. As noted above, the add bus 132 includes the 8-bit data bus 238 and an add signal line 240. These nine signals are coupled from the add bus 132 to an add bus receiver 242 for driving the corresponding bus 232 and add signal line 242. Such signals are coupled as inputs to the PAL chip 172, and particularly to the multiplexer 230. A logic high signal on the add bus line 244 configures the multiplexer 230 for passing a byte of data from input add bus 232 to the multiplexer output bus 234. When the add signal line 244 is at a logic low level, the frame byte signals on input drop bus 228 are passed to the multiplexer output bus 234. Accordingly, the add signal line 244 controls whether each frame byte on the multiplexer output bus 234 is a byte of data carried on the drop bus 212 or the add bus 238. As can be appreciated, if the SONET frame bytes input to the optical bus controller 120 are not modified by the byte signals on the add bus 238, all of the SONET frame bytes input to the controller are output from the controller and pass unchanged to the next node of the SONET network.

The P/S converter circuit 236 converts the byte serial data on bus 234 to serial bit data on line 158. The series of bit signals on line 158 comprise the composite frame according to the SONET protocol, including all of the overhead bytes and the payload bytes. The serial electrical signals on line 158 are coupled to the optical/electrical interface 150 and particularly to the laser driver 154. The laser driver circuit 154 converts the electrical serial bit signals to corresponding optical serial bit signals on the output thereof to the downstream optical fiber 24a.

The processor 168 is of the type 68302 obtainable from Motorola, and is programmed to transfer NMS frames 80 to the various video and other types of modules coupled to the SONET node shelf. The processor 168 has a serial output port for transmitting NMS frame data on transmit line 248. The transmit line 248 is coupled in parallel to an input port of each additional shelf module. Each shelf module can respond or otherwise transmit NMS data to the optical bus controller processor 168 by way of serial receive line 250. The processor 168 also provides an NMS clock on line 252 to synchronize the transmitting and receiving circuits. In order to allow programming and configuration of the circuits at a node, the processor 168 has a serial input port 140 for receiving signals from a Network Management System computer. The processor 168 is coupled to the PAL chip 172 via a bus 169. The PAL chip 172 can thus be configured and monitored by the processor 168.

While not shown, the processor 168 is also coupled to a standard SONET paddle board that may have an 8×2 video switch and a two-channel driver, or a 4×1 video switch and a one-channel driver.

FIGS. 7–9 illustrate the timing relationship in multiplexing byte data between the drop bus 212 and the add bus 238 on the multiplexer output bus 234 of the optical bus controller 120. The signals shown in FIGS. 7–9 identify in parenthetical notation the various lines or buses on which such signals are carried. The drop data bytes are clocked onto the bus 212 on the rising edge of the transmit clock 214. In like manner, add data is clocked onto the add data bus 238 on the rising edge of the transmit byte clock 214. As noted above, the $C_1J_1$ signal 218 and the SPE signal 220 are derived from the S/P converter circuit 116 from the overhead $C_1$ byte and the overhead $J_1$ byte. In particular, the SPE signal is at a logic low level to signify an overhead byte and is at a logic high level to signify a payload byte. This is shown in FIG. 8 where the SPE signal is low during the overhead bytes $A_1$, $A_2$ and $C_1$, but is high during the existence of SONET frame payload bytes. With reference to FIG. 9, it is noted that the add data bytes lag the corresponding drop data bytes by three bytes, or three byte clock periods. In other words, the drop byte data that is changed by the add byte data occurs three bytes after the drop byte time slot.

While the add signal line 240 is common to all other cards of the node and constitutes an input to the optical bus controller 120, each of the other module cards of the node shelf can drive such line during a byte time slot to insert a new byte of data in the corresponding drop bus time slot. With reference to FIGS. 6 and 9, the following description illustrates this procedure. Assuming for purposes of example that it is desired to insert add byte 10 into the drop byte 10 time slot. While there is a 3-byte delay between the drop bus bytes and the add bus bytes, the 3-clock delay provided by the delay circuit 226 aligns the corresponding bytes between the drop bus 212 and add bus 238 as inputs to the multiplexer 230. At the beginning of the time slot for add byte 10, the signal on the add line 240 is driven to a logic high, whereby the multiplexer 230 selects the add byte 10, rather than the drop byte 10, for output on the byte serial bus 234. It is important to note that any one of the video modules or other modules in the node shelf can drive the add signal line 240 to a logic high during one or more byte time slots, to thereby insert corresponding add bytes in the drop bus byte positions. Indeed, and as will be set forth more fully below, when a video camera coupled to a video module is enabled for transmitting video data on the SONET line to an operator control center, the signal on the add line 240 is driven to a logic high level during the requisite VT channel periods of the SONET frame to thereby multiplex such video signals within the SONET frame. When the video camera is disabled, the signal on the add line 240 remains at a logic low level, whereby the video signals that are yet being generated by the video camera are not multiplexed onto the SONET time slots. Also to be discussed in more detail below, the operation of a video monitor coupled to a video module does not require the control of the signal on the add signal line 240, but rather the video signals of the camera carried in the VT channels on the drop bus 212 are simply picked off the bus, decompressed, converted to analog signals and coupled to the video monitor.

With reference back to FIG. 5, there is illustrated two video modules 61 and 62 coupled by two buses 124 and 130 to the respective working and protect drop lines, and by two buses 126 and 132 to the respective working and protect add buses. The video module 61 is shown configured as an encoder for driving one or two monitors 38. As such, such module 61 need only be coupled to the drop bus 124 or 130 to receive the video data during the appropriate VT channels for driving the monitors 38. On the other hand, the video module 62 is shown configured as an encoder for receiving analog video signals from the respective cameras $10_1$–$10_8$. When configured as an encoder, the video module 62 provides the video data bytes in the appropriate VT channels assigned thereto, and drives the add signal line to a logic high level during the time slots of the assigned VT channels.

FIG. 10 illustrates in detailed block diagram form a video module constructed according to the preferred form of the invention. The video module has connections thereto for a maximum of eight video cameras $10_1$–$10_8$ and two video monitors $38_1$ and $38_2$. The video module includes two video channels, and thus can be configured to drive two video monitors or to receive video signals from two of the eight video cameras. Alternatively, the video module can be configured to provide one channel of encoding for a video camera and one channel for decoding to drive a video monitor. While the video module of FIG. 10 is shown coupled to the downstream add bus 126 and the downstream drop bus 124, an identically constructed module would be coupled to the upstream add and drop buses 132 and 130, to provide duplicate facilities for purposes of reliability. While not shown, each camera would have parallel inputs to both the upstream video module and the downstream video module. In like manner, the upstream video module and the downstream video module would provide parallel output connections, each for driving the monitors.

The video module includes a conventional phase locked loop circuit 260 driven by the 6.48 MHz byte clock on line 214. The phase lock loop 260 multiplies the frequency so that when divided, a bit rate of 51.84 Mb/S is obtained. This bit rate corresponds to the OC-1 SONET rate. For OC-3 or other SONET architectures, the phase lock loop circuit 260 can be configured to produce corresponding higher clock rates.

Each video module includes a first codec 270 coupled to a first serial video channel 272. A second codec 274 is coupled to a second serial video channel 276. The codecs 270 and 274 are identical circuits, each identified by type CodecSL-3, made by Enerdyne Corp., Santee, Calif. The codecs are of conventional design, but without provisions for processing voice analog signals. The codec 270 includes an analog input 278 that carries video signals from a camera 10. The codec 270 includes an analog-to-digital converter for converting the analog video signals to corresponding digital video signals. In addition, the codec 270 compresses the digital video data according to a JPEG algorithm. Additional circuits are employed in the codec 270 for discarding video data in the event that insufficient serial data can be handled by a field programmable gate array chip 280, as received on serial line 272. The second codec 274 functions identically with regard to analog video signals received on an input 282.

In the preferred form of the invention, eight video cameras $10_1$–$10_8$ can be coupled to the video module 62. An 8:2 multiplexer 284 selects two of the eight video cameras and couples the corresponding analog video signals to the respective lines 278 and 282. The multiplexer 284 comprises a crosspoint switch integrated circuit, where the two inputs of the eight are selected by select signals on bus 286. The select lines 286 of the multiplexer 284 are coupled to a microprocessor 290 of the type MC68LC302, obtainable from Motorola. The microprocessor is coupled to a 1 Meg flash memory and a 1 Meg RAM. The NMS bus 134 is coupled to the respective ports of the microprocessor 290. In this manner, commands in the NMS frame 80 can be transmitted via the SONET network, received and decoded by the microprocessor 290 for configuring the various circuits of the video module.

The microprocessor 290 is coupled by a common data bus, address bus and control lines 292 to the gate array chip 280 and to a quad universal asynchronous receive transmit (UART) integrated circuit 294. The quad UART 294 is utilized to provide additional serial interface buses for allowing the microprocessor 290 to communicate with the various integrated circuits of the video module. The quad UART 294 includes a first serial line 296 coupled to the codec 270, and a second serial line 298 coupled to the second codec 274. In addition, the quad UART 294 includes third and fourth serial lines 300 and 302, each coupled to a serial line interface 304. The serial line interface 304 receives the digital signals from the UART 294 and converts the same for driving the lines 306 and 308 according to a RS-232, RS-422 or RS-485 protocol. The I/O ports of the serial line interface 304, 306 and 308 are coupled respectively to the pan, tilt and zoom circuits 310 associated with the respective video cameras $10_1$–$10_8$, and to a network controller 312 equipped with network management system software. The video module can be configured by NMS frames 80 received the NMS bus 44, or by way of NMS frames 80 received via the network controller computer 312 on line 308.

While the video module illustrated in FIG. 10 is shown configured as an encoder 61 for processing video signals from the video cameras $10_1$–$10_8$, the module can also be configured as a video module 61 for decoding video signals and driving two monitors $38_1$–$38_2$, shown in broken lines via analog video lines 314 and 316. When the codecs 270 and 274 are configured as decoders, the serial, compressed digital signals received via lines 272 and 276, are decompressed and converted to corresponding analog signals for transfer on the analog lines 314 and 316. The codecs 270 and 274 can be configured as either encoders or decoders by way of signals on the serial communication lines 296 and 298. Moreover, the configuration established in the codecs 270 and 274 can be obtained via the quad UART 294 in response to requests by the microprocessor 290. Once configured as an encoder or decoder, the codecs 270 and 274 remain configured until changed by other software commands. The configuration status of the codecs 270 and 274 is maintained in a nonvolatile register so that if power is removed from the video module and restored, the codecs maintain the configuration as previously established.

The gate array chip 280 is identified as type XC5215 HQ208, manufactured by Xilinx, San Jose, Calif. The gate array chip 280 is provided with the 12-bit drop bus 124 for making available to the video module 62 all 810 bytes of a SONET frame, in addition to the parity bit, the $C_1J_1$ and SPE signals and a byte clock signal. The gate array chip 280 is responsive to the $C_1J_1$ and SPE signals for decoding the payload bytes. In addition, the gate array 280 includes counters that are programmable via the microprocessor 290 for responding to selected VT channels of the SONET frame, converting the respective parallel bits of a byte to serial form, and transferring the serial video data steam to a respective codec 270 or 274. Indeed, when the video module is configured as a decoder 61, the gate array chip 280 is programmed to respond independently to two sets of VT channels, one associated with the first codec 270 and the other associated with the second codec 274. The respective serial video data streams are coupled from the gate array chip 280 to the codecs 270 and 274. In the codecs 270 and 274, and as noted above, the respective serial video data streams are decompressed, converted to analog signals and transmitted on the respective lines 314 and 316 to the monitors $38_1$–$38_2$. If the gate array chip 280 has been programmed by the microprocessor 290 to provide 1.5 MHz bandwidth signals to the codecs 270 and 274, then for each respective codec, the gate array chip 280 will decode twenty-eight bytes of data from a SONET frame and couple the same to the respective codec. If a higher bandwidth signal is transmitted on the SONET frame, then the gate array chip 280 will be programmed to decode the respective SONET channel payload bytes of a group corresponding to the selected VT channels. When the video module is configured as a decoder 61 to drive two monitors $38_1$–$38_2$, the gate array chip 280 does not actively drive the add bus 238 or the add signal on line 240.

In the event the video module is configured as an encoder 62, the gate array chip 280 is programmed by the microprocessor 290 to activate the add bus 238 during the respective VT channels for adding the byte serial video data from the codecs 270 and 274 thereon. If, for example, the first codec 270 has been assigned the twenty-four VT channels of a SONET frame, then twenty-four bytes of video data will be provided to the gate array chip 280 on line 272 and stored in a serial-to-parallel shift register. When the first VT1 channel time slot exists, as determined by the $C_1J_1$ and SPE signals on the drop bus 124, the add bus 238 will be driven with the eight video bits during the first VT time slot, and the add signal on line 240 will be driven high. The subsequent twenty-three video bytes will be driven on the add bus 238 during the succeeding twenty-three VT1 channels and the add signal on line 244 will be driven high during the respective VT time slots. The video signals from the second codec 274 will be processed in a similar manner and placed on a different set of VT channels during the respective time slots. The add bus 238 carries the two VT channels of video signals to the optical bus controller 120 and received by the add bus receiver 242. The add data is then multiplexed onto the respective time slots of the multiplexer output bus 234. The gate array chip 280 is fabricated with a tri-state high impedance output for driving the add signal line 240. The add line drivers of the other shelf modules are similarly designed. While not shown, a resistor connected between the add signal line 240 and ground provides a passive pull down for the line. By controlling the signal on the add signal line 240 with the gate array chip 280, the two selected video cameras are thus switched or activated at the node to cause the SONET frame to carry the video signals.

During operation of the video module encoder 62, NMS date frames 80 can be communicated to the microprocessor 290 for selectively driving the video camera multiplexer 284, via bus 286 to select one or two different video cameras for transmitting different images by way of the SONET network. In addition, the gate array chip 280 can be reconfigured on the fly to multiplex the two video streams onto different VT channels of the SONET frame. In the event that one or the other or both video cameras of a video module encoder 62 are to be switched off at the node, NMS command messages are transmitted to the microprocessor 290, decoded therein and coupled to the gate array chip 280 to reconfigure the circuits for preventing the signal on the add signal line 240 from being driven high. While the video camera will still be producing video streams, the digital compressed video stream will not be added to the add bus 238 and thus the cameras will be effectively switched off. It is to be noted that other modules in the node shelf can drive the add line 240 to thus switch on other modules at the node and cause the transmission or reception of video data with respect to the SONET frame. In the even that two modules inadvertently attempt to drive the add signal line 240 high at the same VT channel, the data added to the add bus 238 will be corrupted and a parity error will result. The parity error will be sensed by the optical bus controller 120 and corrective or diagnostic functions will be carried out.

FIG. 11 illustrates the SONET OCC node 50 coupled to the equipment of the control center shown in FIG. 2. The control center is shown with six video monitors, each pair 38, and 382 coupled to a respective video module configured as a decoder 61. The control panel 42 and the computer 44 are conventional equipment for allowing an operator to select a particular video camera and present the image on a monitor 38. Each monitor 38 has a unique identity associated therewith, and programmed into the video control computer 44. While the control panel 42 is shown with manual switches for control of the video images, a programmed computer and keyboard and/or mouse can also provide the operator with the ability to select the video images and a respective monitor 38 to display the camera signals. Insofar as numerous vendors provide the video equipment, there are a number of different protocols transmitted by the video control computer 44 on the RS-232 line 46. The signals on line 46, of whatever protocol, essentially transmit commands such as, for example, to connect camera 50 to monitor 5. These serial signals are coupled to the working and protect bus controllers 120 and 122, and particularly to the respective processors 168. The processor 168 in each bus controller 120, 122 is programmed to translate these native commands into corresponding NMS commands. In order to cross-reference camera 50 and monitor 5 to destination addresses shown in FIG. 4a, a look-up table is utilized. For example, camera 50 will be referenced in the look-up table as a destination address having a node address field 86, a shelf address field 88, a card address field 90 and an auxiliary address field 92. The destination address corresponding to camera 50 is unique, and thus only one card in a node will respond. Moreover, during initial configuration of the system, each monitor 38 is assigned a VT channel for receiving video signals, and such channel assignment is stored in the memory of the bus controllers 120 and 122. Accordingly, when the processor 168 of the bus controller receives and decodes the native command concerning monitor 5, it will be cross-referenced in the look-up table to the assigned VT channel. With this information, the processor 168 of the bus controller will assemble an NMS frame 80 with the destination address of camera 50, a command to write to the module connected to camera 50, and a data field 106 having the VIDs corresponding to camera connect functions and the data corresponding to the VT channel assigned to monitor 5. The NMS frame will be transmitted on a byte-by-byte basis in the designated DS0 channel of the SONET frame.

When the node matching the destination address of the transmitted NMS frame receives the frame 80, it will be decoded. The processor 290 in the video module 62 will communicate with the FPGA chip 280 to program the counter to provide outputs corresponding to time slots assigned to monitor 5, control the camera multiplexer 284 to select camera 50, and then provide the compressed video data in the assigned time slots corresponding to the VT channels. With this arrangement, video equipment and other equipment coupled to the SONET network nodes can be controlled.

While the preferred embodiment of the invention has been disclosed with reference to specific apparatus, equipment and the circuits, and methods of operation thereof, it is to be understood that many changes in detail may be made as a matter of engineering choices, without departing from the spirit and scope of the invention, as defined by the appended claims.

What is claimed is:

1. Apparatus for controlling a circuit coupled to a node of a multi-node optical communication network of a type producing a plurality of time slots for carrying data therein, comprising:

a control circuit located at a source node of the multi-node network for transmitting on the optical network a control signal that specifies a time slot of an optical frame for carrying data; and a destination node for receiving the control signal via the optical network for configuring a destination circuit to select said specified time slot and to couple data from said destination circuit to said specified time slot, whereby said destination circuit is controlled at said destination node.

2. The apparatus of claim 1, wherein said destination circuit includes video apparatus coupled to a first circuit that is responsive to said time slot for associating video data from said video apparatus with said time slot, and a second circuit for transferring the video data in a corresponding time slot in the optical frame.

3. The apparatus of claim 2, wherein said first circuit provides said video data at a time associated with said specified time slot to said second circuit together with an enable signal, whereby said second circuit transfers said video data to said optical frame at a time when said enable signal is active.

4. The apparatus of claim 3, wherein said second circuit includes a drop bus that carries optical frame drop data, and said first circuit includes an add bus that carries add video data, and said second circuit includes a multiplexer that multiplexes the add video data onto said optical frame during an active time of said enable signal.

5. The apparatus of claim 4, wherein said optical network comprises a SONET network, and said enable signal is active 24 times during an OC-1 SONET frame to provide a 1.5 MHz bandwidth.

6. The apparatus of claim 3, wherein said video apparatus comprises a video camera, and wherein said first circuit is programmable to respond to one or more time slots of an optical frame, to transfer video data from a single said video camera in association with the optical frame.

7. The apparatus of claim 6, wherein said first circuit is adapted to receive commands via said optical network from said source node to activate said enable signal during said one or more time slots to thereby effectively couple the video data from the video camera to said optical frame.

8. The apparatus of claim 7, wherein said video camera is effectively disconnected from said optical network by maintaining said enable signal inactive during said one or more time slots.

9. The apparatus of claim 1, wherein each node coupled to the optical network has a unique equipment address, and further including an equipment configuration protocol transmitted via said optical network, said equipment configuration protocol providing a destination address, and a plurality of commands, each said node being responsive to receipt of said equipment configuration protocol to decode the destination address and compare the destination address with the unique equipment address, and if a match is found, at least one command of said plurality of commands is decoded and carried out to control node equipment.

10. Apparatus for controlling circuits by way of an optical network of a type having a plurality of time slots for carrying optical signals, comprising:

at least one source node coupled to said optical network for transmitting thereon commands to a destination node for controlling the coupling of data from said destination node to said optical network in one of said time slots;

at least one said destination node having an optical input coupled to said optical network and an optical output coupled to said optical network, said destination node for receiving said commands, and including:
   an electric drop bus,
   an optical-to-electrical converter for converting optical signals via said optical network input to corresponding electrical signals carried on said drop bus,
   an electrical add bus for carrying data generated by electrical circuits coupled to said destination node,
   a selector for selecting electrical signals from either said drop bus or said add bus,
   a control signal line carrying a control signal for controlling said selector for selecting electrical data from said drop bus or said add bus, and
   an electrical-to-optical converter for converting electrical signals output from said selector to corresponding optical signals coupled to the optical output of said destination node.

11. The apparatus of claim 10, wherein said source node includes a processor programmed to provide a communications protocol using said commands, and said source node including circuits for transmitting said communications protocol via time slots of said optical network for controlling the transmission of data generated at said destination node within time slots of said optical network.

12. The apparatus of claim 11, wherein said communications protocol includes commands for controlling when said control signal is enabled to select between said drop bus and said add bus.

13. The apparatus of claim 11, wherein said communications protocol includes a command field specifying a function to be carried out, and an associated data field specifying one of said plurality of time slots to be utilized.

14. The apparatus of claim 10, further including data processing circuits associated with said destination node for receiving video data via said drop bus and converting said video data for display on a monitor, said data processing circuits coupled to a video camera that generates video data, and said data processing circuits transfer the video data to said optical network via said add bus and said selector.

15. A method for controlling circuits by way of an optical network of a type having a plurality of time slots for carrying optical signals, comprising the steps of:

communicating commands via said optical network to at least one node connected thereto for controlling the transmission of data on said optical network by said node;

decoding by circuits in said node said commands to identify one or more time slots to be utilized for the transmission of the data on said optical network;

programming circuits in said node to associate the data from at least one data source with the identified one or more time slots;

multiplexing the data generated by said data source into said identified one or more time slots of said optical network; and reprogramming said circuits in said node to cause the multiplexing of the data into other time slots of said optical network in response to a decoding of other commands received by said node via said optical network.

16. The method of claim 15, further including providing an electrical drop bus and an electrical add bus in said node for respectively receiving data from the optical network and for transmitting data generating at said node on said optical network.

17. The method of claim 16, further including overwriting data carried on the electrical drop bus if data generated at said node is to be transmitted in the respective time slots, and at other times allowing data on the drop bus to be retransmitted on the optical network in a form unchanged from that received by said node via said optical network.

18. The method of claim 15, further including transmitting the data in a first set of time slots corresponding to a first destination, and transmitting data in a second set of time slots corresponding to a second destination.

19. The method of claim 15, further including communicating said commands by a master node to a plurality of slave nodes connected to said optical network, and controlling by said master node the time slots to be used by each of said slave nodes.

20. The method of claim 15, further including communicating command signals to a plurality of nodes coupled to said optical network, to thereby dynamically control the time slot usage by each said node.

21. The method of claim 15, further including changing bandwidth usage of said node by said commands to increase or decrease a number of time slots utilized by the node to transmit data therein.

22. The method of claim 15, further including communicating different commands to said node to thereby dynamically change the transmission of the data from a first set of time slots to a second set of time slots, and to dynamically change the number of time slots utilized to thereby change a bandwidth usage by the node.

23. Apparatus for controlling circuits by way of an optical network of a type having a plurality of time slots for carrying optical signals, comprising:

a network node having an optical input port coupled to said optical network and an optical output port coupled to said optical network, said node including:

a bus controller having an optical-to-electrical converter for converting optical signals at said input port to corresponding electrical signals;

a serial-to-parallel converter for converting electrical signals output by said optical-to-electrical converter from serial signals to byte serial data;

a parallel-to-serial converter for converting byte serial data to corresponding serial data;

an electrical-to-optical converter for converting the output serial data from said parallel-to-serial converter to corresponding optical signals, said electrical-to-optical converter for coupling the serial optical signals to the optical output port;

a drop bus for carrying said byte serial data corresponding to data received by said network node via said optical network;

an add bus for carrying byte serial data generated at said node;

a multiplexer having a first input coupled to said drop bus and a second input coupled to said add bus;

an output of said multiplexer coupling byte serial data to said parallel-to-serial converter, and a control input for selecting one of said first input or said second input of said multiplexer for coupling the serial data to an output of said multiplexer; and a control circuit for enabling the control input of said multiplexer to couple byte serial data on said add bus during a specified time slot to said multiplexer output.

24. The apparatus of claim 23, further including plural data generating circuits associated with said node, said add bus being coupled to each said data generating circuit, and an add signal line connected to said control input being controlled to thereby cause said multiplexer to couple data on said add bus as generated by said data generating circuits to the output of said multiplexer in different time slots.

25. The apparatus of claim 24, wherein said control circuit comprises a respective programmable circuit in each said data generating circuit, and further including an enable signal coupled to said multiplexer control input and to each said programmable circuit for coordinating the multiplexing of data on the add bus at different time slots.

26. The apparatus of claim 23, further including in combination a data generator circuit comprising a video camera for generating video signals, and including a video signal compressor for compressing the video signals.

27. The apparatus of claim 26, further including a plurality of said video cameras, each said video camera being coupled to a video signal multiplexer, and said video signal compressor being connected to an output of said video signal multiplexer.

28. The apparatus of claim 26, whereas said video signal compressor also functions to decompress video signals, and further including at least one video monitor coupled to an output of said compressor for receiving decompressed video signals.

29. Apparatus for controlling circuits by way of an optical network of a type having a plurality of time slots for carrying optical signals, comprising:

at least one slave node coupled to said optical network;

a master node coupled to said optical network, said master node including a processor programmed with a communications protocol, said communications protocol providing data identifying each said slave node, providing data identifying circuits in each said slave node and providing data identifying one or more time slots of said optical network to be utilized by the slave node for transmitting therein data generated at the respective slave node;

said master node including encoding circuits for encoding said communications protocol into one or more time slots of said optical network so as to be available to each said slave node; and said slave node including decoding circuits responsive to the time slots of the optical network carrying said communications protocol for decoding node identification data, circuit identification data and time slot data, and for configuring circuits in said slave node to generate data and transmit the generated data in the time slots specified by said decoded time slot data.

30. The apparatus of claim 29, further including circuits in said slave node for configuring data processing circuits to receive data in time slots specified according to said decoded communications protocol.

31. The apparatus of claim 29, further including circuits in said slave node for communicating information to said master node via said communications protocol.

32. The apparatus of claim 29, wherein said optical network comprises a SONET ring.

33. The apparatus of claim 1, wherein said destination node includes a circuit for coupling data generated at said destination node to said optical network in said specified time slot.

* * * * *